United States Patent
Otani et al.

(10) Patent No.: US 7,796,359 B2
(45) Date of Patent: Sep. 14, 2010

(54) MAGNETIC HEAD FOR PERPENDICULAR MAGNETIC RECORDING AND METHOD OF MANUFACTURING THE SAME, THE MAGNETIC HEAD INCLUDING POLE LAYER AND TWO SHIELDS SANDWICHING THE POLE LAYER

(75) Inventors: Koichi Otani, Tokyo (JP); Hiromichi Umehara, Tokyo (JP); Naoto Matono, Hong Kong (CN); Takamitsu Sakamoto, Tokyo (JP); Noriaki Kasahara, Tokyo (JP); Hidetaka Kawano, Tokyo (JP)

(73) Assignees: TDK Corporation, Tokyo (JP); SAE Magnetics (H.K.) Ltd., Hong Kong (CN)

( * ) Notice: Subject to any disclaimer, the term of this patent is extended or adjusted under 35 U.S.C. 154(b) by 624 days.

(21) Appl. No.: 11/892,541

(22) Filed: Aug. 23, 2007

(65) Prior Publication Data

US 2009/0052094 A1 Feb. 26, 2009

(51) Int. Cl.
*G11B 5/127* (2006.01)

(52) U.S. Cl. .................................. 360/125.01
(58) Field of Classification Search ............ 360/125.01, 360/245.3, 121, 123.13, 123.02; 29/603.13, 29/603.14
See application file for complete search history.

(56) References Cited

U.S. PATENT DOCUMENTS

| 7,652,855 | B2 * | 1/2010 | Freitag et al. ............... 360/322 |
| 2002/0034043 | A1 | 3/2002 | Okada et al. |
| 2002/0154453 | A1 * | 10/2002 | Ikeda .......................... 360/322 |
| 2006/0203384 | A1 | 9/2006 | Maruyama et al. |
| 2008/0055788 | A1 * | 3/2008 | Nagai .......................... 360/323 |
| 2008/0239580 | A1 * | 10/2008 | Harada et al. ............... 360/250 |
| 2008/0247087 | A1 * | 10/2008 | Otani et al. .................. 360/122 |
| 2009/0086385 | A1 * | 4/2009 | Gill et al. ............... 360/324.11 |

FOREIGN PATENT DOCUMENTS

| JP | B2 3740361 | 2/2006 |
| JP | A 2006-147010 | 6/2006 |
| JP | A 2006-252620 | 9/2006 |

* cited by examiner

*Primary Examiner*—Allen T Cao
(74) *Attorney, Agent, or Firm*—Oliff & Berridge, PLC

(57) ABSTRACT

A magnetic head includes a pole layer, a first and a second shield disposed to sandwich the pole layer, and a nonmagnetic layer disposed around the first shield. The pole layer includes a first portion having an end face located in a medium facing surface, and a second portion that is located farther from the medium facing surface than is the first portion. The second portion is greater in thickness than the first portion. A bottom surface of the second portion is located closer to a substrate than is a bottom surface of the first portion. The first shield has a first top surface portion opposed to the bottom surface of the first portion with the first gap layer in between. The nonmagnetic layer has a second top surface portion opposed to the bottom surface of the second portion with the first gap layer in between. A difference in level is formed between the first and the second top surface portion such that the second top surface portion is located closer to the substrate than is the first top surface portion.

22 Claims, 13 Drawing Sheets

MAGNETIC HEAD FOR PERPENDICULAR MAGNETIC RECORDING AND METHOD OF MANUFACTURING THE SAME, THE MAGNETIC HEAD INCLUDING POLE LAYER AND TWO SHIELDS SANDWICHING THE POLE LAYER

BACKGROUND OF THE INVENTION

1. Field of the Invention

The present invention relates to a magnetic head for perpendicular magnetic recording that is used for writing data on a recording medium by means of a perpendicular magnetic recording system and a method of manufacturing such a magnetic head, and to a head assembly and a hard disk drive each of which includes the magnetic head for perpendicular magnetic recording.

2. Description of the Related Art

For magnetic read/write devices such as magnetic disk drives, higher recording density has been constantly required to achieve a higher storage capacity and smaller dimensions. Typically, magnetic heads used in magnetic read/write devices are those having a structure in which a reproducing (read) head having a magnetoresistive element (that may be hereinafter referred to as an MR element) for reading and a recording (write) head having an induction-type electromagnetic transducer for writing are stacked on a substrate.

Write heads include those of a longitudinal magnetic recording system wherein signals are magnetized in the direction along the surface of the recording medium (the longitudinal direction) and those of a perpendicular magnetic recording system wherein signals are magnetized in the direction perpendicular to the surface of the recording medium. Recently, the shift from the longitudinal magnetic recording system to the perpendicular magnetic recording system has been promoted in order to achieve higher recording density of magnetic read/write devices.

A write head for the perpendicular magnetic recording system includes a coil for generating a magnetic field corresponding to data to be written on a recording medium, and a pole layer for allowing a magnetic flux corresponding to the magnetic field generated by the coil to pass therethrough and generating a write magnetic field for writing the data on the recording medium. The pole layer has an end face located in a medium facing surface, and the width of this end face defines the track width.

As one of magnetic heads for perpendicular magnetic recording, there is known a magnetic head including a first and a second shield disposed to sandwich the pole layer, as disclosed in U.S. Patent Application Publication No. 2006/0203384 A1, for example. In this magnetic head, an end face of the first shield is located in the medium facing surface at a position backward of the end face of the pole layer along the direction of travel of the recording medium with a specific distance provided therebetween. An end face of the second shield is located forward of the end face of the pole layer along the direction of travel of the recording medium with a specific distance provided therebetween. The first and the second shield have a function of preventing a magnetic flux from reaching the recording medium, the magnetic flux having been generated from the end face of the pole layer and expanding in directions except the direction orthogonal to the surface of the recording medium. A magnetic head including such a first shield and a second shield is capable of attaining a higher recording density.

A magnetic head for use in a magnetic disk drive such as a hard disk drive is typically provided in a slider. The slider has the medium facing surface. The medium facing surface has an air-inflow-side end and an air-outflow-side end. The slider is designed to slightly fly over the surface of the recording medium by means of an airflow that comes from the air-inflow-side end into the space between the medium facing surface and the recording medium. The magnetic head is typically disposed near the air-outflow-side end of the medium facing surface of the slider. In a magnetic disk drive, the magnetic head is aligned through the use of a rotary actuator, for example. In this case, the magnetic head moves over the recording medium along a circular orbit centered on the center of rotation of the rotary actuator. In such a magnetic disk drive, a tilt of the magnetic head with respect to the tangent of the circular track, which is called a skew, occurs in accordance with the position of the magnetic head across the tracks.

In a magnetic disk drive of the perpendicular magnetic recording system, in particular, which exhibits a better capability of writing on a recording medium compared with the longitudinal magnetic recording system, if the above-mentioned skew occurs, there arise problems such as a phenomenon in which, when data is written on a certain track, data stored on a track adjacent thereto is erased (this is hereinafter called adjacent track erase), or unwanted writing performed between two adjacent tracks. To achieve higher recording density, it is required to suppress adjacent track erase. Unwanted writing between two adjacent tracks affects detection of servo signals for alignment of the magnetic head and the signal-to-noise ratio of a read signal.

As one of techniques for preventing the problems resulting from the skew described above, there is known a technique in which the end face of the pole layer located in the medium facing surface is formed into such a shape that the side located backward along the direction of travel of the recording medium (that is, the side located closer to the air inflow end of the slider) is shorter than the opposite side, as disclosed in U.S. Patent Application Publication No. 2002/0034043 A1 and JP 2006-147010A, for example. According to this technique, however, the cross-sectional area of the pole layer perpendicular to the direction in which magnetic flux flows is reduced in a neighborhood of the medium facing surface. As a result, the pole layer becomes unable to introduce magnetic flux of great magnitude to the medium facing surface, and this results in degradation of write characteristics such as overwrite property, which is a parameter indicating an overwriting capability.

To solve the problems resulting from the skew, it is also effective to reduce the thickness of the pole layer taken in the medium facing surface. However, if the entire pole layer is made thin, the cross-sectional area of the pole layer perpendicular to the direction in which magnetic flux flows is reduced. In this case also, the pole layer becomes unable to introduce magnetic flux of great magnitude to the medium facing surface, and this results in degradation of write characteristics such as overwrite property.

U.S. Patent Application Publication No. 2002/0034043 A1 discloses a technique of making the thickness of a portion of the pole layer (the main pole) near the medium facing surface decrease with decreasing distance from the medium facing surface. However, this technique has a disadvantage that, if the position of the medium facing surface varies when the medium facing surface is formed by polishing, the thickness of the pole layer taken in the medium facing surface varies and the write characteristics thereby vary.

JP 2006-147010A discloses a pole layer made up of a stack of a bottom auxiliary pole layer, a main pole layer and a top auxiliary pole layer. The bottom auxiliary pole layer touches a region of the bottom surface of the main pole layer away from the medium facing surface, while the top auxiliary pole layer touches a region of the top surface of the main pole layer away from the medium facing surface. In this pole layer, a stepped portion is formed in each of the top surface and the bottom surface such that the thickness of the pole layer taken at a position away from the medium facing surface is greater than the thickness of the pole layer taken in the medium facing surface.

Here, consideration is given to a case of forming a stepped portion in the bottom surface of the pole layer of a magnetic head having a first shield and a second shield, the first shield being located closer to the substrate than is the second shield, so as to make the thickness of the pole layer taken at a position away from the medium facing surface greater than the thickness of the pole layer taken in the medium facing surface. In this case, flux leakage from the stepped portion of the bottom surface of the pole layer to the first shield can occur. The degree of this leakage varies depending on the positional relationship between the first shield and the stepped portion of the bottom surface of the pole layer. Furthermore, the write characteristics of the magnetic head vary depending on the degree of this flux leakage. Accordingly, the positional relationship between the first shield and the stepped portion of the bottom surface of the pole layer has an influence on the write characteristics. To control the write characteristics accurately, it is therefore important to accurately define the positional relationship between the first shield and the stepped portion of the bottom surface of the pole layer.

OBJECT AND SUMMARY OF THE INVENTION

It is an object of the present invention to provide a magnetic head for perpendicular magnetic recording and a method of manufacturing the same, the magnetic head enabling prevention of the problems resulting from the skew, providing improved write characteristics and enabling accurate control of the write characteristics, and to provide a head assembly and a magnetic disk drive each of which includes the magnetic head for perpendicular magnetic recording.

A first or a second magnetic head for perpendicular magnetic recording of the present invention includes: a medium facing surface that faces toward a recording medium; a coil that generates a magnetic field corresponding to data to be written on the recording medium; a pole layer that has an end face located in the medium facing surface, allows a magnetic flux corresponding to the magnetic field generated by the coil to pass therethrough and generates a write magnetic field for writing the data on the recording medium by means of a perpendicular magnetic recording system; a first shield made of a magnetic material and having an end face located in the medium facing surface at a position backward of the end face of the pole layer along a direction of travel of the recording medium; a nonmagnetic layer made of a nonmagnetic material and disposed around the first shield; a first gap layer made of a nonmagnetic material, disposed between the pole layer and each of the first shield and the nonmagnetic layer, and having an end face located in the medium facing surface; a second shield made of a magnetic material and having an end face located in the medium facing surface at a position forward of the end face of the pole layer along the direction of travel of the recording medium; a second gap layer made of a nonmagnetic material, disposed between the second shield and the pole layer and having an end face located in the medium facing surface; and a substrate on which the coil, the pole layer, the first and the second shield, and the first and the second gap layer are stacked.

In the first or the second magnetic head of the invention, the first shield is located closer to the substrate than is the second shield.

In the first magnetic head of the invention, the pole layer includes: a first portion having the end face located in the medium facing surface; and a second portion that is adjacent to the first portion and located farther from the medium facing surface than is the first portion. The second portion has a thickness greater than that of the first portion. Each of the first portion and the second portion has a bottom surface that is closer to the substrate. The bottom surface of the second portion is located closer to the substrate than is the bottom surface of the first portion. The first shield has a first top surface portion that is opposed to the bottom surface of the first portion with the first gap layer in between. The nonmagnetic layer has a second top surface portion that is opposed to the bottom surface of the second portion with the first gap layer in between. A difference in level is formed between the first top surface portion and the second top surface portion such that the second top surface portion is located closer to the substrate than is the first top surface portion.

In the first magnetic head of the invention, the difference in level between the first top surface portion and the second top surface portion and the difference between the bottom surface of the first portion and the bottom surface of the second portion in distance from the substrate may be substantially equal. In addition, the difference in level between the first top surface portion and the second top surface portion and the difference between the bottom surface of the first portion and the bottom surface of the second portion in distance from the substrate may both be within a range of 0.02 to 0.3 µm.

In the first magnetic head of the invention, the first shield may have a connecting surface that connects the first top surface portion and the second top surface portion to each other, and the pole layer may have a connecting surface that connects the bottom surface of the first portion and the bottom surface of the second portion to each other. In this case, the distance between the end face of the pole layer and the end face of the first shield in the medium facing surface and the distance between the connecting surface of the first shield and the connecting surface of the pole layer may be substantially equal. In addition, the distance between the end face of the pole layer and the end face of the first shield in the medium facing surface and the distance between the connecting surface of the first shield and the connecting surface of the pole layer may both be within a range of 0.05 to 0.7 µm.

In the first magnetic head of the invention, the first shield may include a first layer, and a second layer that is disposed between the first layer and the first gap layer. In this case, the length of the second layer taken in the direction perpendicular to the medium facing surface may be smaller than the length of the first layer taken in the direction perpendicular to the medium facing surface.

In the first magnetic head of the invention, the second shield may be magnetically connected to the pole layer at a position away from the medium facing surface, and the coil may include a portion that passes through a space surrounded by the pole layer and the second shield. In this case, the magnetic head may further include a yoke layer connected to a top surface of the second portion of the pole layer that is opposite to the bottom surface thereof, and the second shield may be connected to the yoke layer at a position away from the medium facing surface. An end face of the yoke layer closer to the medium facing surface may be located father from the medium facing surface than is the boundary between the first portion and the second portion.

A method of manufacturing the first magnetic head of the invention includes the steps of: forming the first shield having the first top surface portion; forming a layer to be etched that will be partially etched later to thereby become the nonmagnetic layer; partially etching the layer to be etched so that the second top surface portion is formed in the top surface of the layer to be etched and the layer to be etched thereby becomes the nonmagnetic layer; forming the first gap layer to cover the first top surface portion and the second top surface portion; forming the pole layer on the first gap layer; forming the second gap layer after the pole layer is formed; forming the second shield after the second gap layer is formed; and forming the coil.

In the second magnetic head of the invention, the pole layer includes: a first portion having the end face located in the medium facing surface; and a second portion that is adjacent to the first portion and located farther from the medium facing surface than is the first portion. The second portion has a thickness greater than that of the first portion. Each of the first portion and the second portion has a bottom surface that is closer to the substrate. The bottom surface of the second portion is located closer to the substrate than is the bottom surface of the first portion. The first shield has a first top surface portion that is opposed to the bottom surface of the first portion with the first gap layer in between, and a second top surface portion that is opposed to a part of the bottom surface of the second portion with the first gap layer in between. The nonmagnetic layer has a third top surface portion that is opposed to another part of the bottom surface of the second portion with the first gap layer in between. A difference in level is formed between the first top surface portion and the second top surface portion of the first shield such that the second top surface portion is located closer to the substrate than is the first top surface portion.

In the second magnetic head of the invention, the difference in level between the first top surface portion and the second top surface portion and the difference between the bottom surface of the first portion and the bottom surface of the second portion in distance from the substrate may be substantially equal. In addition, the difference in level between the first top surface portion and the second top surface portion and the difference between the bottom surface of the first portion and the bottom surface of the second portion in distance from the substrate may both be within a range of 0.02 to 0.3 µm.

In the second magnetic head of the invention, the first shield may have a connecting surface that connects the first top surface portion and the second top surface portion to each other, and the pole layer may have a connecting surface that connects the bottom surface of the first portion and the bottom surface of the second portion to each other. In this case, the distance between the end face of the pole layer and the end face of the first shield in the medium facing surface and the distance between the connecting surface of the first shield and the connecting surface of the pole layer may be substantially equal. In addition, the distance between the end face of the pole layer and the end face of the first shield in the medium facing surface and the distance between the connecting surface of the first shield and the connecting surface of the pole layer may both be within a range of 0.05 to 0.7 µm.

In the second magnetic head of the invention, the second shield may be magnetically connected to the pole layer at a position away from the medium facing surface, and the coil may include a portion that passes through a space surrounded by the pole layer and the second shield. In this case, the magnetic head may further include a yoke layer connected to a top surface of the second portion of the pole layer that is opposite to the bottom surface thereof, and the second shield may be connected to the yoke layer at a position away from the medium facing surface. An end face of the yoke layer closer to the medium facing surface may be located father from the medium facing surface than is the boundary between the first portion and the second portion.

A method of manufacturing the second magnetic head of the invention includes the steps of forming a layer for shield that will be partially etched later to thereby become the first shield; forming a layer to be etched that will be partially etched later to thereby become the nonmagnetic layer; partially etching the layer for shield and the layer to be etched so that the first top surface portion and the second top surface portion are formed in the top surface of the layer for shield and the layer for shield thereby becomes the first shield, and so that the third top surface portion is formed in the top surface of the layer to be etched and the layer to be etched thereby becomes the nonmagnetic layer; forming the first gap layer to cover the first to third top surface portions; forming the pole layer on the first gap layer; forming the second gap layer after the pole layer is formed; forming the second shield after the second gap layer is formed; and forming the coil.

A first or a second head assembly of the present invention includes: a slider including the first or the second magnetic head of the invention and disposed to face toward a recording medium; and a supporter flexibly supporting the slider.

A first or a second magnetic disk drive of the present invention includes: a slider including the first or the second magnetic head of the invention and disposed to face toward a recording medium that is driven to rotate; and an alignment device supporting the slider and aligning the slider with respect to the recording medium.

According to the first or the second magnetic head of the invention or the method of manufacturing the same, or the head assembly or the magnetic disk drive including the first or the second magnetic head, the pole layer includes the first portion having the end face located in the medium facing surface and the second portion that is adjacent to the first portion and located farther from the medium facing surface than is the first portion, and the second portion has a thickness greater than that of the first portion. This makes it possible to prevent the problems resulting from the skew and to improve the write characteristics.

According to the first magnetic head of the invention or the method of manufacturing the same, or the head assembly or the magnetic disk drive including the first magnetic head, it is possible to accurately define the positional relationship between a combination of the first top surface portion of the first shield and the second top surface portion of the nonmagnetic layer and a combination of the bottom surface of the first portion and the bottom surface of the second portion of the pole layer. As a result, it is possible to accurately control the write characteristics.

According to the second magnetic head of the invention or the method of manufacturing the same, or the head assembly or the magnetic disk drive including the second magnetic head, it is possible to accurately define the positional relationship between a combination of the first top surface portion and the second top surface portion of the first shield and a combination of the bottom surface of the first portion and the bottom surface of the second portion of the pole layer. As a result, it is possible to accurately control the write characteristics.

According to the method of manufacturing the first magnetic head of the invention, it is possible to form the pole layer including the first and the second portion through a simple process, and it is also possible to accurately define the positional relationship between the combination of the first top surface portion of the first shield and the second top surface portion of the nonmagnetic layer and the combination of the bottom surface of the first portion and the bottom surface of the second portion of the pole layer through a simple process.

According to the method of manufacturing the second magnetic head of the invention, it is possible to form the pole layer including the first and the second portion through a simple process, and it is also possible to accurately define the positional relationship between the combination of the first top surface portion and the second top surface portion of the first shield and the combination of the bottom surface of the first portion and the bottom surface of the second portion of the pole layer through a simple process.

Other and further objects, features and advantages of the invention will appear more fully from the following description.

DETAILED DESCRIPTION OF THE PREFERRED EMBODIMENTS

First Embodiment

Figure 1:
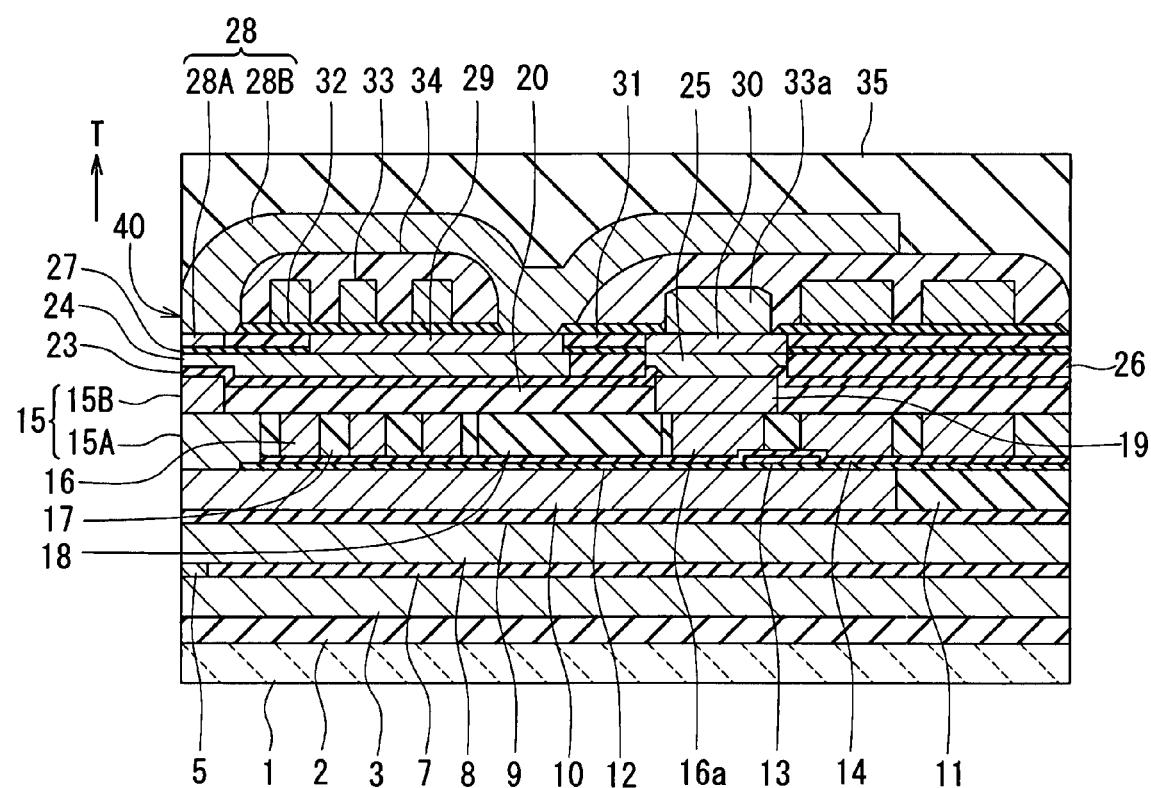
FIG. 1 is a cross-sectional view illustrating the configuration of a magnetic head of a first embodiment of the invention.
Figure 2:
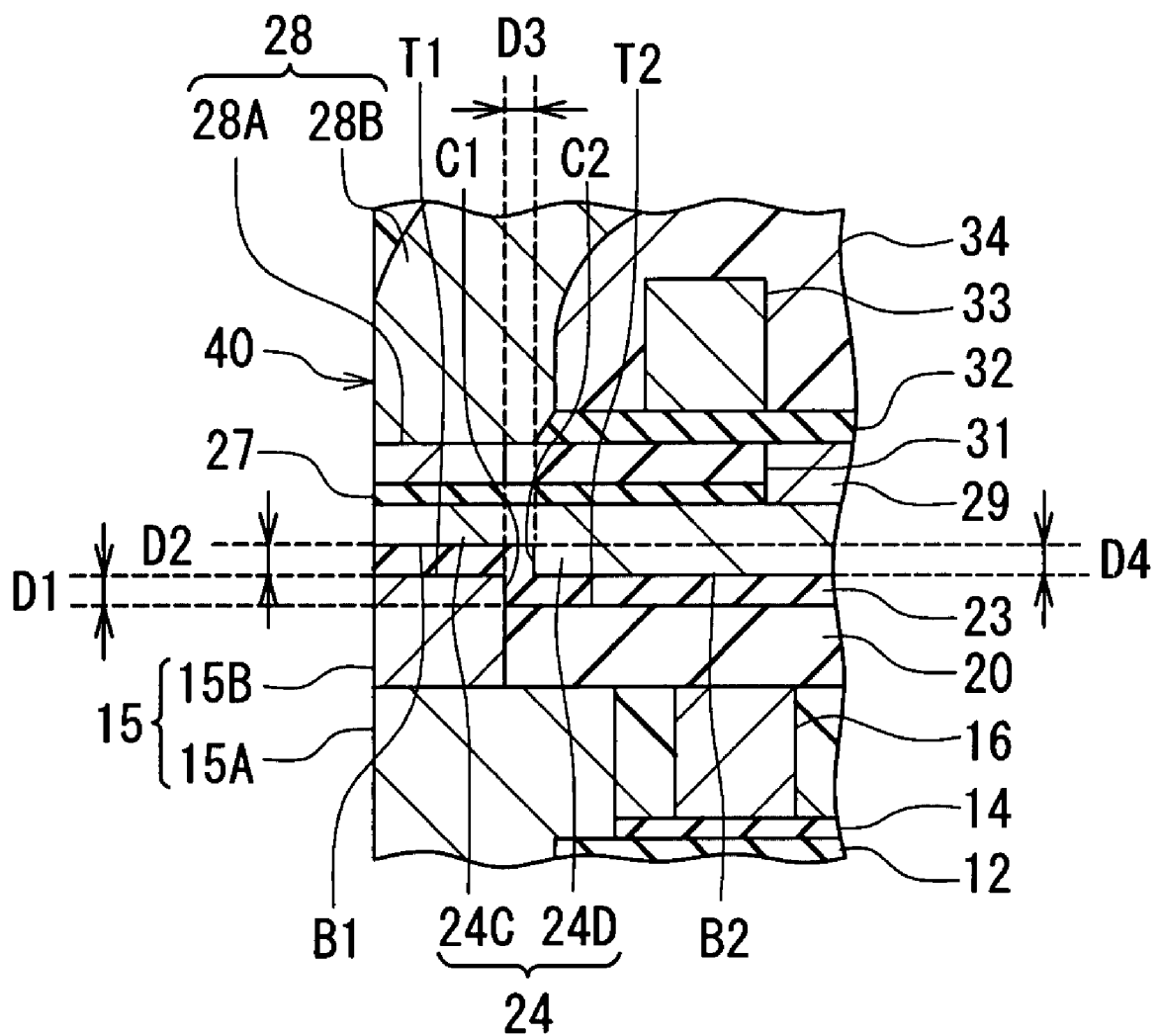
FIG. 2 is a cross-sectional view illustrating the main part of the magnetic head of the first embodiment of the invention.
Figure 3:
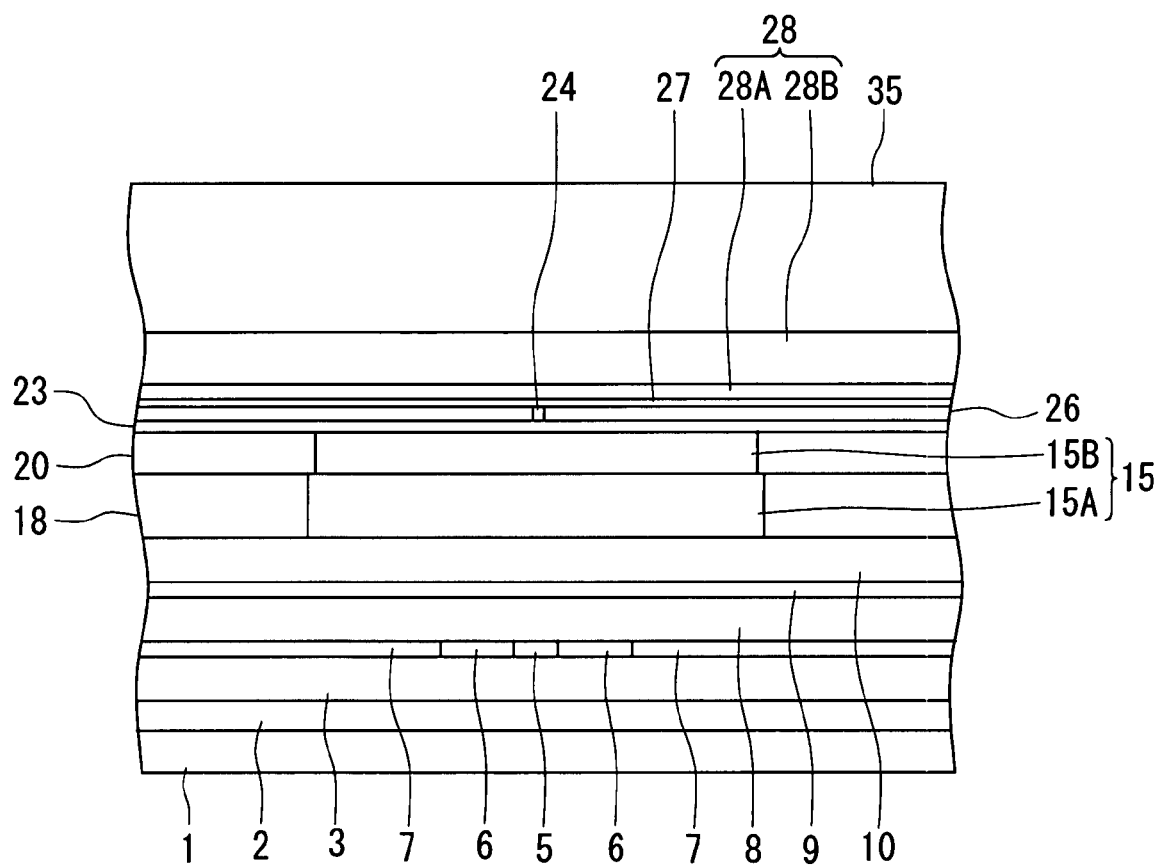
FIG. 3 is a front view of the medium facing surface of the magnetic head of the first embodiment of the invention.

Embodiments of the present invention will now be described in detail with reference to the drawings. Reference is first made to FIG. 1 to FIG. 3 to describe the configuration of a magnetic head for perpendicular magnetic recording (hereinafter simply referred to as a magnetic head) of a first embodiment of the invention. Here is given an example of a magnetic head in which a TMR element utilizing a tunneling magnetoresistive effect is employed as the MR element. FIG. 1 is a cross-sectional view illustrating the configuration of the magnetic head. FIG. 2 is a cross-sectional view illustrating the main part of the magnetic head. FIG. 3 is a front view of the medium facing surface of the magnetic head. FIG. 1 illustrates a cross section perpendicular to the medium facing surface and the top surface of the substrate. In FIG. 1 the arrow marked with T shows the direction of travel of a recording medium.

As illustrated in FIG. 1, the magnetic head of this embodiment has a medium facing surface 40 that faces toward the recording medium. As illustrated in FIG. 1 and FIG. 3, the magnetic head includes: a substrate 1 made of a ceramic material such as aluminum oxide and titanium carbide ($Al_2O_3$—TiC); an insulating layer 2 made of an insulating material such as alumina ($Al_2O_3$) and disposed on the substrate 1; a first read shield layer 3 made of a magnetic material and disposed on the insulating layer 2; an MR element 5 disposed on the first read shield layer 3; two bias magnetic field applying layers 6 disposed adjacent to two sides of the MR element 5, respectively, with insulating films (not shown) respectively disposed therebetween; and an insulating layer 7 disposed around the MR element 5 and the bias magnetic field applying layers 6. The MR element 5 has an end located in the medium facing surface 40. The insulating layer 7 is made of an insulating material such as alumina. The magnetic head further includes: a second read shield layer 8 made of a magnetic material and disposed on the MR element 5, the bias magnetic field applying layers 6 and the insulating layer 7; and a separating layer 9 made of a nonmagnetic material such as alumina and disposed on the second read shield layer 8. The portion from the first read shield layer 3 to the second read shield layer 8 makes up a read head.

The MR element 5 is a TMR element. A sense current, which is a current for detecting magnetic signals, is fed to the MR element 5 in a direction intersecting the plane of each layer making up the MR element 5, such as the direction perpendicular to the plane of each layer making up the MR element 5.

The magnetic head further includes: a magnetic layer 10 made of a magnetic material and disposed on the separating layer 9; and an insulating layer 11 made of an insulating material such as alumina and disposed around the magnetic layer 10. The magnetic layer 10 has an end face located in the medium facing surface 40. The magnetic layer 10 and the insulating layer 11 have flattened top surfaces.

The magnetic head further includes: an insulating film 12 disposed on the magnetic layer 10 and the insulating layer 11; a heater 13 disposed on the insulating film 12; and an insulating film 14 disposed on the insulating film 12 and the heater 13 such that the heater 13 is sandwiched between the insulating films 12 and 14. The function and material of the heater 13 will be described later. The insulating films 12 and 14 are made of an insulating material such as alumina. An end of each of the insulating films 12 and 14 closer to the medium facing surface 40 is located away from the medium facing surface 40. In the example illustrated in FIG. 1, the end of the insulating film 14 closer to the medium facing surface 40 is located farther from the medium facing surface 40 than is the end of the insulating film 12 closer to the medium facing surface 40. On the contrary, however, the end of the insulating film 12 closer to the medium facing surface 40 may be located farther from the medium facing surface 40 than is the end of the insulating film 14 closer to the medium facing surface 40. Alternatively, the end of the insulating film 12 closer to the medium facing surface 40 and the end of the insulating film 14 closer to the medium facing surface 40 may be located such that the respective distances from the medium facing surface 40 are equal.

The magnetic head further includes a first shield 15 disposed on the magnetic layer 10. The first shield 15 includes: a first layer 15A disposed on the magnetic layer 10; and a second layer 15B disposed on the first layer 15A. The first layer 15A and the second layer 15B are made of a magnetic material. Each of the first layer 15A and the second layer 15B has an end face located in the medium facing surface 40. In the example illustrated in FIG. 1, the length of the second layer 15B taken in the direction perpendicular to the medium facing surface 40 is smaller than the length of the first layer 15A taken in the direction perpendicular to the medium facing surface 40. However, the length of the second layer 15B taken in the direction perpendicular to the medium facing surface 40 may be equal to or greater than the length of the first layer 15A taken in the direction perpendicular to the medium facing surface 40.

The magnetic head further includes: a coil 16 made of a conductive material and disposed on the insulating film 14; an insulating layer 17 with which the space between the coil 16 and the first layer 15A and the space between respective adjacent turns of the coil 16 are filled; and an insulating layer 18 disposed around the first layer 15A, the coil 16 and the insulating layer 17. The coil 16 is planar spiral-shaped. The coil 16 includes a connecting portion 16a that is a portion near an inner end of the coil 16 and connected to another coil described later. The insulating layer 17 is made of photoresist, for example. The insulating layer 18 is made of alumina, for example. The first layer 15A, the coil 16, the insulating layer 17 and the insulating layer 18 have flattened top surfaces.

The magnetic head further includes: a connecting layer 19 made of a conductive material and disposed on the connecting portion 16a; and a nonmagnetic layer 20 made of a nonmagnetic material and disposed around the second layer 15B and the connecting layer 19. The connecting layer 19 may be made of a material the same as that of the second layer 15B. In the example illustrated in FIG. 1, since the nonmagnetic layer 20 touches the coil 16 and the connecting layer 19, the nonmagnetic layer 20 needs to be made of an insulating material. The material of the nonmagnetic layer 20 can be alumina, for example. It should be noted that the nonmagnetic layer 20 may be made of a conductive material if insulation is established between the nonmagnetic layer 20 and each of the coil 16 and the connecting layer 19 by providing, for example, an insulating film between the nonmagnetic layer 20 and each of the coil 16 and the connecting layer 19. The coil 16 can be dispensed with. In the case where the coil 16 is not provided, the nonmagnetic layer 20 may be made of a conductive material.

The magnetic head further includes a first gap layer 23 disposed on the second layer 15B, the connecting layer 19 and the nonmagnetic layer 20. The first gap layer 23 has an opening formed in a region corresponding to the top surface of the connecting layer 19. The first gap layer 23 is made of a nonmagnetic insulating material such as alumina.

The magnetic head further includes: a pole layer 24 made of a magnetic material and disposed on the first gap layer 23; a connecting layer 25 made of a conductive material and disposed on the connecting layer 19; and an insulating layer 26 made of an insulating material such as alumina and disposed around the pole layer 24 and the connecting layer 25. The pole layer 24 has an end face located in the medium facing surface 40. The connecting layer 25 is connected to the connecting layer 19 through the opening of the first gap layer 23. The connecting layer 25 may be made of a material the same as that of the pole layer 24. The pole layer 24, the connecting layer 25 and the insulating layer 26 have flattened top surfaces.

The magnetic head further includes a second gap layer 27 disposed on the pole layer 24 and the insulating layer 26. The second gap layer 27 has an opening for exposing a portion of the top surface of the pole layer 24 located away from the medium facing surface 40, and an opening for exposing the top surface of the connecting layer 25. The second gap layer 27 is made of a nonmagnetic material such as alumina.

The magnetic head further includes a second shield 28 disposed on the second gap layer 27. The second shield 28 includes: a first layer 28A disposed on the second gap layer 27; and a second layer 28B disposed on the first layer 28A. The first layer 28A and the second layer 28B are made of a magnetic material. Each of the first layer 28A and the second layer 28B has an end face located in the medium facing surface 40.

The magnetic head further includes: a yoke layer 29 made of a magnetic material and disposed on a region of the pole layer 24 away from the medium facing surface 40; a connecting layer 30 made of a conductive material and disposed on the connecting layer 25; and an insulating layer 31 made of an insulating material such as alumina and disposed around the first layer 28A, the yoke layer 29 and the connecting layer 30. The yoke layer 29 and the connecting layer 30 may be made of a material the same as that of the first layer 28A. The first layer 28A, the yoke layer 29, the connecting layer 30 and the insulating layer 31 have flattened top surfaces.

The magnetic head further includes an insulating layer 32 made of an insulating material such as alumina and disposed on the yoke layer 29 and the insulating layer 31. The insulating layer 32 has an opening for exposing the top surface of the first layer 28A, an opening for exposing a portion of the top surface of the yoke layer 29 near an end thereof farther from the medium facing surface 40, and an opening for exposing the top surface of the connecting layer 30.

The magnetic head further includes a coil 33 made of a conductive material and disposed on the insulating layer 32. The coil 33 is planar spiral-shaped. The coil 33 includes a connecting portion 33a that is a portion near an inner end of the coil 33 and connected to the connecting portion 16a of the coil 16. The connecting portion 33a is connected to the connecting layer 30, and connected to the connecting portion 16a through the connecting layers 19, 25 and 30.

The magnetic head further includes an insulating layer 34 disposed to cover the coil 33. The insulating layer 34 is made of photoresist, for example. The second layer 28B of the second shield 28 is disposed on the first layer 28A, the yoke layer 29 and the insulating layer 34, and connects the first layer 28A and the yoke layer 29 to each other.

The magnetic head further includes an overcoat layer 35 made of an insulating material such as alumina and disposed to cover the second layer 28B. The portion from the magnetic layer 10 to the second layer 28B makes up a write head.

As described so far, the magnetic head includes the medium facing surface 40 that faces toward the recording medium, the read head, and the write head. The read head and the write head are stacked on the substrate 1. The read head is disposed backward along the direction T of travel of the recording medium (that is, disposed closer to the air-inflow end of the slider), while the write head is disposed forward along the direction T of travel of the recording medium (that is, disposed closer to the air-outflow end of the slider). The magnetic head writes data on the recording medium through the use of the write head, and reads data stored on the recording medium through the use of the read head.

The read head includes the MR element 5, and the first read shield layer 3 and the second read shield layer 8 that are disposed to sandwich the MR element 5 therebetween. FIG. 1 and FIG. 3 illustrate an example in which the MR element 5 is a TMR element. The first read shield layer 3 and the second read shield layer 8 also function as a pair of electrodes for feeding a sense current to the MR element 5 in a direction intersecting the plane of each layer making up the MR element 5, such as the direction perpendicular to the plane of each layer making up the MR element 5. Besides the first read shield layer 3 and the second read shield layer 8, there may be provided a pair of electrodes on top and bottom of the MR element 5, respectively. The MR element 5 has a resistance that changes in response to an external magnetic field, that is, a signal magnetic field sent from the recording medium. The resistance of the MR element 5 can be determined from the sense current. It is thus possible for the read head to read data stored on the recording medium.

The MR element 5 is not limited to a TMR element but may be a GMR (giant-magnetoresistive) element. The GMR element may be one having a CIP (current-in-plane) structure in which the sense current is fed in a direction nearly parallel to the plane of each layer making up the GMR element, or may be one having a CPP (current-perpendicular-to-plane) structure in which the sense current is fed in a direction intersecting the plane of each layer making up the GMR element, such as the direction perpendicular to the plane of each layer making up the GMR element. In the case where the MR element 5 is a GMR element having the CIP structure, a pair of electrodes for feeding the sense current to the MR element 5 are respectively provided on both sides of the MR element 5 that are opposed to each other in the width direction, and shield gap films made of an insulating material are respectively provided between the MR element 5 and the first read shield layer 3 and between the MR element 5 and the second read shield layer 8.

The write head includes the magnetic layer 10, the first shield 15, the coil 16, the nonmagnetic layer 20, the first gap layer 23, the pole layer 24, the second gap layer 27, the second shield 28, the yoke layer 29, and the coil 33. The first shield 15 is located closer to the substrate 1 than is the second shield 28.

The coils 16 and 33 generate a magnetic field that corresponds to data to be written on the recording medium. The pole layer 24 has an end face located in the medium facing surface 40, allows a magnetic flux corresponding to the magnetic field generated by the coils 16 and 33 to pass, and generates a write magnetic field used for writing the data on the recording medium by means of the perpendicular magnetic recording system.

The first shield 15 is made of a magnetic material, and has an end face located in the medium facing surface 40 at a position backward of the end face of the pole layer 24 along the direction T of travel of the recording medium. The first gap layer 23 is made of a nonmagnetic material, has an end face located in the medium facing surface 40, and is disposed between the first shield 15 and the pole layer 24. In the embodiment, the first shield 15 includes the first layer 15A disposed on the magnetic layer 10, and the second layer 15B disposed on the first layer 15A. Part of the coil 16 is located on a side of the first layer 15A so as to pass through the space between the magnetic layer 10 and the pole layer 24.

The first layer 15A has a thickness within a range of 0.5 to 3 µm, for example. The first layer 15A has a width of 5 µm or greater, for example. The length of the first layer 15A taken in the direction perpendicular to the medium facing surface 40 is within a range of 0.5 to 2.0 µm, for example. The second layer 15B has a thickness within a range of 0.1 to 1.5 µm, for example. The second layer 15B has a width of 5 µm or greater, for example. The length of the second layer 15B taken in the direction perpendicular to the medium facing surface 40 is within a range of 0.05 to 1.0 µm, for example. However, the length of the second layer 15B taken in the direction perpendicular to the medium facing surface 40 is preferably smaller than the length of the first layer 15A taken in the direction perpendicular to the medium facing surface 40. The "thickness" of each of the layers making up the magnetic head, such as the first layer 15A and the second layer 15B, is the dimension taken in the direction in which the plurality of layers making up the magnetic head are stacked.

The magnetic layer 10 has a function of returning a magnetic flux that has been generated from the end face of the pole layer 24 and has magnetized the recording medium. FIG. 1 illustrates an example in which the magnetic layer 10 has an end face located in the medium facing surface 40. However, since the magnetic layer 10 is connected to the first shield 15 having an end face located in the medium facing surface 40, such a configuration is also possible that an end face of the magnetic layer 10 closer to the medium facing surface 40 is located away from the medium facing surface 40.

In the medium facing surface 40, the end face of the first shield 15 (the end face of the second layer 15B) is located backward of the end face of the pole layer 24 along the direction T of travel of the recording medium (that is, located closer to the air-inflow end of the slider) with a specific small distance provided therebetween by the first gap layer 23. The distance between the end face of the pole layer 24 and the end face of the first shield 15 in the medium facing surface 40 is preferably within a range of 0.05 to 0.7 µm, and more preferably within a range of 0.1 to 0.3 µm.

The first shield 15 takes in a magnetic flux that is generated from the end face of the pole layer 24 located in the medium facing surface 40 and that expands in directions except the direction orthogonal to the surface of the recording medium, and thereby prevents this flux from reaching the recording medium. It is thereby possible to improve recording density.

The second shield 28 is made of a magnetic material, and has an end face located in the medium facing surface 40 at a position forward of the end face of the pole layer 24 along the direction T of travel of the recording medium. The second gap layer 27 is made of a nonmagnetic material, has an end face located in the medium facing surface 40, and is disposed between the second shield 28 and the pole layer 24. In the embodiment, the second shield 28 includes the first layer 28A disposed on the second gap layer 27, and the second layer 28B disposed on the first layer 28A. Part of the coil 33 is disposed to pass through the space surrounded by the pole layer 24 and the second shield 28. The second shield 28 is connected to the yoke layer 29 at a position away from the medium facing surface 40. Therefore, the second shield 28 is magnetically connected to the pole layer 24 through the yoke layer 29 at a position away from the medium facing surface 40. The pole layer 24, the second shield 28 and the yoke layer 29 form a magnetic path that allows a magnetic flux corresponding to the magnetic field generated by the coil 33 to pass therethrough.

In the medium facing surface 40, the end face of the second shield 28 (the end face of the first layer 28A) is located forward of the end face of the pole layer 24 along the direction T of travel of the recording medium (that is, located closer to the air-outflow end of the slider) with a specific small distance provided therebetween by the second gap layer 27. The distance between the end face of the pole layer 24 and the end face of the second shield 28 in the medium facing surface 40 is preferably equal to or smaller than 0.2 µm, and more preferably within a range of 25 to 50 nm, so that the second shield 28 can fully exhibit its function as a shield.

The position of the end of a bit pattern to be written on the recording medium is determined by the position of an end of the pole layer 24 closer to the second gap layer 27 in the medium facing surface 40. The second shield 28 takes in a magnetic flux that is generated from the end face of the pole layer 24 located in the medium facing surface 40 and that expands in directions except the direction orthogonal to the surface of the recording medium, and thereby prevents this flux from reaching the recording medium. It is thereby possible to improve recording density. Furthermore, the second shield 28 takes in a disturbance magnetic field applied from outside the magnetic head to the magnetic head. It is thereby possible to prevent erroneous writing on the recording medium caused by the disturbance magnetic field intensively taken in into the pole layer 24. The second shield 28 also has a function of returning a magnetic flux that has been generated from the end face of the pole layer 24 and has magnetized the recording medium.

FIG. 1 illustrates an example in which neither the magnetic layer 10 nor the first shield 15 is connected to the pole layer 24. However, the magnetic layer 10 may be connected to the pole layer 24 at a position away from the medium facing surface 40. The coil 16 is not an essential component of the write head and can be dispensed with. In the example illustrated in FIG. 1, the yoke layer 29 is disposed on the pole layer 24, that is, disposed forward of the pole layer 24 along the direction T of travel of the recording medium (that is, disposed closer to the air-outflow end of the slider). Alternatively, however, the yoke layer 29 may be disposed below the pole layer 24, that is, disposed backward of the pole layer 24 along the direction T of travel of the recording medium (that is, disposed closer to the air-inflow end of the slider).

The heater 13 is provided for heating the components of the write head including the pole layer 24 so as to control the distance between the recording medium and the end face of the pole layer 24 located in the medium facing surface 40. Two leads that are not shown are connected to the heater 13. For example, the heater 13 is formed of a NiCr film or a stack of a Ta film, a NiCu film and a Ta film. The heater 13 is energized through the two leads and thereby produces heat, and heats the components of the write head. As a result, the components of the write head expand and the end face of the pole layer 24 located in the medium facing surface 40 thereby gets closer to the recording medium.

Reference is now made to FIG. 2 to describe in detail the shapes of the first shield 15, the nonmagnetic layer 20, the first gap layer 23, the pole layer 24 and the yoke layer 29, and the positional relationship among these layers. The pole layer 24 includes: a first portion 24C having the end face located in the medium facing surface 40; and a second portion 24D that is adjacent to the first portion 24C and located farther from the medium facing surface 40 than is the first portion 24C. The second portion 24D has a thickness greater than that of the first portion 24C. The first portion 24C has a bottom surface B1 that is closer to the substrate 1. The bottom surface B1 is substantially perpendicular to the medium facing surface 40. The second portion 24D has a bottom surface B2 that is closer to the substrate 1. The bottom surface B2 of the second portion 24D is located closer to the substrate 1 than is the bottom surface B1 of the first portion 24C. At least in the neighborhood of the medium facing surface 40, the top surface of the pole layer 24 is substantially perpendicular to the medium facing surface 40.

The second layer 15B of the first shield 15 has a first top surface portion T1 that is opposed to the bottom surface B1 of the first portion 24C with the first gap layer 23 in between. The nonmagnetic layer 20 has a second top surface portion T2 that is opposed to the bottom surface B2 of the second portion 24D with the first gap layer 23 in between. A difference in level D1 is formed between the first top surface portion T1 and the second top surface portion T2 such that the second top surface portion T2 is located closer to the substrate than is the first top surface portion T1.

The second layer 15B further has a connecting surface C1 that connects the first top surface portion T1 and the second top surface portion T2 to each other. The connecting surface C1 is part of an end face of the second layer 15B located opposite to the medium facing surface 40. The pole layer 24 has a connecting surface C2 that connects the bottom surface B1 of the first portion 24C and the bottom surface B2 of the second portion 24D to each other.

The first gap layer 23 is disposed to cover the first top surface portion T1, the second top surface portion T2 and the connecting surface C1. The top surface of the first gap layer 23 has a shape conforming to the shape of a combination of the first top surface portion T1, the second top surface portion T2 and the connecting surface C1. Accordingly, a combination of the bottom surface B1 of the first portion 24C, the bottom surface B2 of the second portion 24D and the connecting surface C2 also has a shape conforming to the shape of the combination of the first top surface portion T1, the second top surface portion T2 and the connecting surface C1.

In the example illustrated in FIG. 2, the connecting surfaces C1 and C2 are both parallel to the medium facing surface 40. However, it is not necessarily required that the connecting surfaces C1 and C2 be parallel to the medium facing surface 40. The connecting surfaces C1 and C2 are almost parallel to each other, however, even in the case where they are not parallel to the medium facing surface 40. When the connecting surfaces C1 and C2 are formed to be nonparallel to the medium facing surface 40, it is preferred that the connecting surfaces C1 and C2 be inclined such that the distance from the medium facing surface 40 increases with decreasing distance from the substrate 1.

Here, the difference between the bottom surface B1 of the first portion 24C and the bottom surface B2 of the second portion 24D in distance from the substrate 1 is called a difference in level between the bottom surface B1 and the bottom surface B2, and is represented by "D4". Since the shape of the combination of the bottom surface B1 of the first portion 24C, the bottom surface B2 of the second portion 24D and the connecting surface C2 conforms to the shape of the combination of the first top surface portion T1, the second top surface portion T2 and the connecting surface C1 as previously mentioned, the difference in level D1 between the first top surface portion T1 and the second top surface portion T2 and the difference in level D4 between the bottom surface B1 and the bottom surface B2 are substantially equal. D1 and D4 are both within a range of 0.02 to 0.3 µm, for example.

The distance between the end face of the pole layer 24 and the end face of the first shield 15 (the second layer 15B) in the medium facing surface 40 is represented by "D2". The distance between the connecting surface C1 and the connecting surface C2 is represented by "D3". D2 and D3 are both defined by the thickness of the first gap layer 23. D2 and D3 are therefore substantially equal. D2 and D3 are both within a range of 0.05 to 0.7 µm, for example. D2 and D3 may be equal to or different from D1 and D4.

The distance between the medium facing surface 40 and the boundary between the first portion 24C and the second portion 24D is nearly equal to the value obtained by adding the thickness of the first gap layer 23 to the length of the second layer 15B taken in the direction perpendicular to the medium facing surface 40. As previously mentioned, the length of the second layer 15B taken in the direction perpendicular to the medium facing surface 40 is within the range of 0.05 to 1.0 µm, for example. The distance between the end face of the pole layer 24 and the end face of the first shield 15 in the medium facing surface 40, that is, the thickness of the first gap layer 23, is preferably within the range of 0.05 to 0.7 µm. Therefore, the distance between the medium facing surface 40 and the boundary between the first portion 24C and the second portion 24D is within a range of 0.1 to 1.7 µm, for example.

The yoke layer 29 is connected to the top surface of the second portion 24D of the pole layer 24 that is opposite to the bottom surface B2. As illustrated in FIG. 1, the second layer 28B of the second shield 28 is connected to the yoke layer 29 at a position away from the medium facing surface 40. An end face of the yoke layer 29 that is closer to the medium facing surface 40 is located farther from the medium facing surface 40 than is the boundary between the first portion 24C and the second portion 24D of the pole layer 24. The yoke layer 29 preferably has a thickness greater than the difference in level D4 between the bottom surface B1 and the bottom surface B2. The thickness of the yoke layer 29 is within a range of 0.05 to 1.0 µm, for example.

Figure 4:
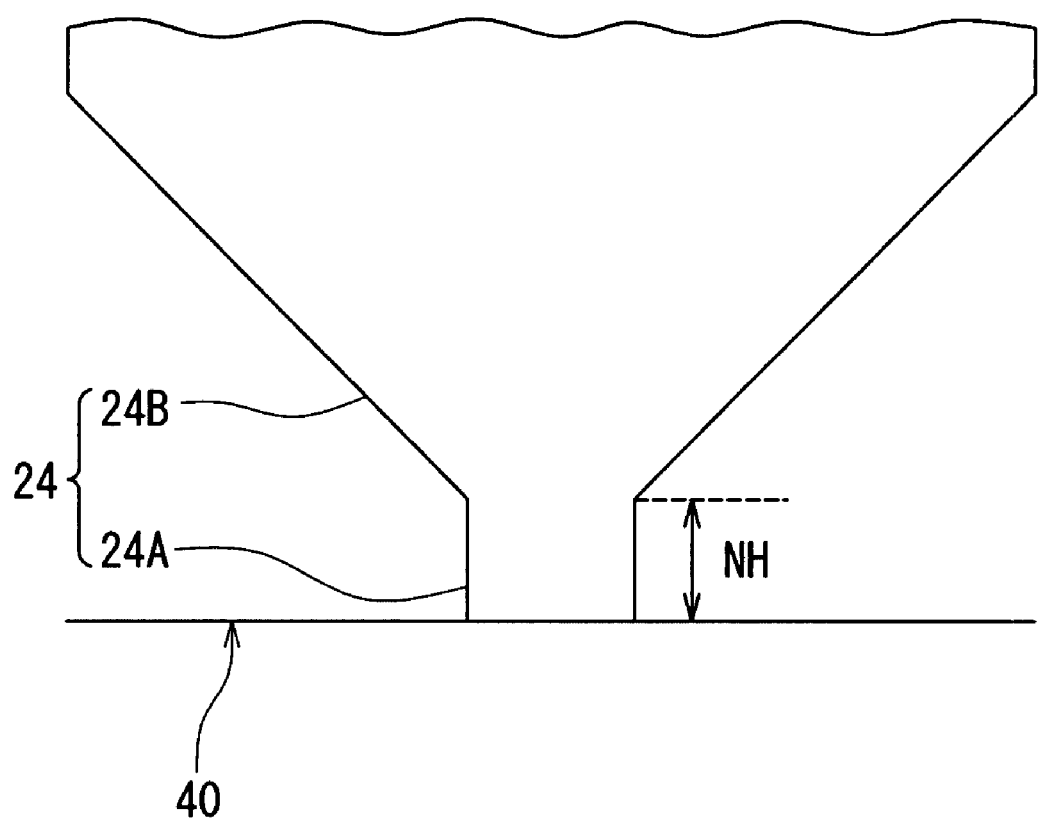
FIG. 4 is a top view of part of a pole layer of the first embodiment of the invention.

Reference is now made to FIG. 4 to describe the plane geometry of the pole layer 24. FIG. 4 is a top view of a portion of the pole layer 24 near the medium facing surface 40. The pole layer 24 includes a track width defining portion 24A and a wide portion 24B. The track width defining portion 24A includes a first end located in the medium facing surface 40 and a second end located away from the medium facing surface 40, and has a width that defines the track width. The wide portion 24B is coupled to the second end of the track width defining portion 24A and has a width greater than the width of the track width defining portion 24A. The width of the track width defining portion 24A is nearly uniform. The wide portion 24B is, for example, equal in width to the track width defining portion 24A at the boundary with the track width defining portion 24A, and gradually increases in width with increasing distance from the medium facing surface 40 and then maintains a specific width to the end of the wide portion 24B. Here, the length of the track width defining portion 24A taken in the direction perpendicular to the medium facing surface 40 is called a neck height, and is represented by "NH". The neck height NH is within a range of 0.05 to 0.20 µm, for example.

The distance between the medium facing surface 40 and the boundary between the first portion 24C and the second portion 24D may be equal to or different from the neck height NH.

Reference is now made to FIG. 5 to FIG. 12 to describe a method of manufacturing the magnetic head of the embodiment. Each of FIG. 5 to FIG. 12 is a cross-sectional view of a stack of layers obtained in the course of manufacture of the magnetic head. In FIG. 5 to FIG. 12 the portions from the substrate 1 to the separating layer 9 are omitted.

In the method of manufacturing the magnetic head of the embodiment, for example, components of a plurality of magnetic heads are formed on a single substrate (wafer) to thereby fabricate a substructure in which pre-slider portions each of which is to become a slider later are aligned in a plurality of rows. Next, the substructure is cut to fabricate a slider aggregate including a single row of the pre-slider portions. Next, a surface formed in the slider aggregate by cutting the substructure is lapped to form the medium facing surfaces 40 of the pre-slider portions that the slider aggregate includes. Next, flying rails are formed in the medium facing surfaces 40. Next, the slider aggregate is cut so that the pre-slider portions are separated from one another, and a plurality of sliders respectively including the magnetic heads are thereby obtained.

Attention being drawn to one of the magnetic heads, the method of manufacturing the magnetic head of the embodiment will now be described. In this method, first, the insulating layer 2 is formed on the substrate 1. Next, the first read shield layer 3 is formed on the insulating layer 2. Next, the MR element 5, the two bias magnetic field applying layers 6 and the insulating layer 7 are formed on the first read shield layer 3. Next, the second read shield layer 8 is formed on the MR element 5, the bias magnetic field applying layers 6 and the insulating layer 7. Next, the separating layer 9 is formed on the second read shield layer 8.

Figure 5:
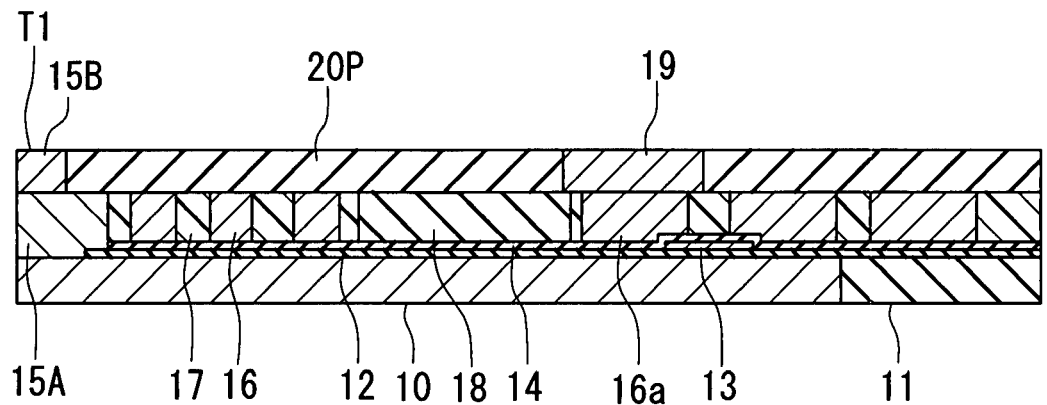
FIG. 5 is a cross-sectional view illustrating a step of a method of manufacturing the magnetic head of the first embodiment of the invention.

FIG. 5 illustrates the next step. In this step, first, the magnetic layer 10 is formed on the separating layer 9 by frame plating, for example. Next, the insulating layer 11 is formed to cover the magnetic layer 10. Next, the insulating layer 11 is polished by chemical mechanical polishing (hereinafter referred to as CMP), for example, so that the magnetic layer 10 is exposed, and the top surfaces of the magnetic layer 10 and the insulating layer 11 are thereby flattened. Next, the insulating film 12 is formed on the magnetic layer 10 and the insulating layer 11. Next, the heater 13, and the leads (not shown) are formed on the insulating film 12. Next, the insulating film 14 is formed on the insulating film 12, the heater 13 and the leads so as to cover the heater 13 and the leads.

Next, the first layer 15A of the first shield 15 is formed on the magnetic layer 10 by frame plating, for example. Next, the coil 16 is formed on the insulating film 14 by frame plating, for example. Next, the insulating layer 17 is formed so that the space between the coil 16 and the first layer 15A and the space between the respective adjacent turns of the coil 16 are filled with the insulating layer 17.

Next, the insulating layer 18 is formed on the entire top surface of the stack of layers that has been formed through the foregoing steps. Next, the insulating layer 18 is polished by CMP, for example, so that the first layer 15A and the coil 16 are exposed, and the top surfaces of the first layer 15A, the coil 16 and the insulating layer 18 are thereby flattened.

Next, the second layer 15B and the connecting layer 19 are formed by frame plating, for example. Next, a layer to be etched 20P is formed on the entire top surface of the stack of layers. The layer to be etched 20P will be partially etched later to thereby become the nonmagnetic layer 20. Next, the layer to be etched 20P is polished by CMP, for example, so that the second layer 15B and the connecting layer 19 are exposed, and the top surfaces of the second layer 15B, the connecting layer 19 and the layer to be etched 20P are thereby flattened.

As a result, the top surface of the second layer 15B becomes the first top surface portion T1.

Figure 6:
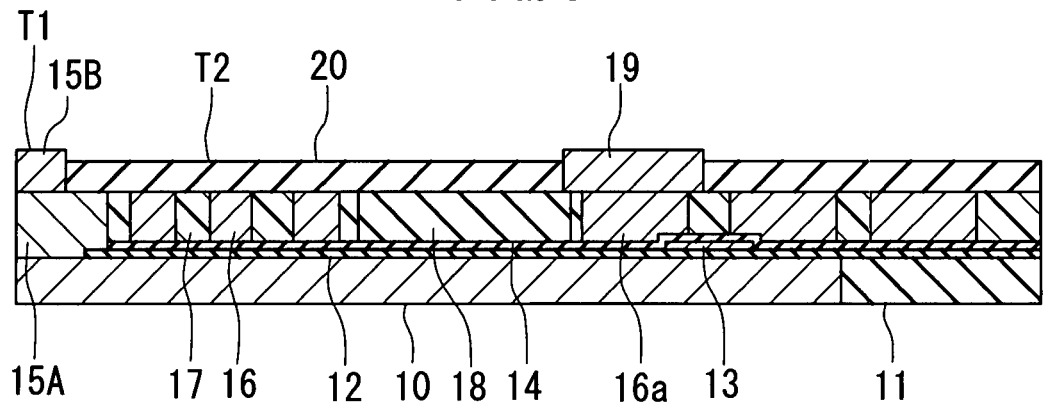
FIG. 6 is a cross-sectional view illustrating a step that follows the step of FIG. 5.

FIG. 6 illustrates the next step. In this step, a portion of the layer to be etched 20 is selectively etched. As a result, the second top surface portion T2 is formed in the top surface of the layer to be etched 20, and the layer to be etched 20P thereby becomes the nonmagnetic layer 20. To etch the layer to be etched 20, such an etching method can be employed that the etching rate of the layer to be etched 20 is higher than the etching rate of each of the second layer 15B and the connecting layer 19. To be specific, reactive ion etching or wet etching can be employed as the method of etching the layer to be etched 20.

Figure 7:
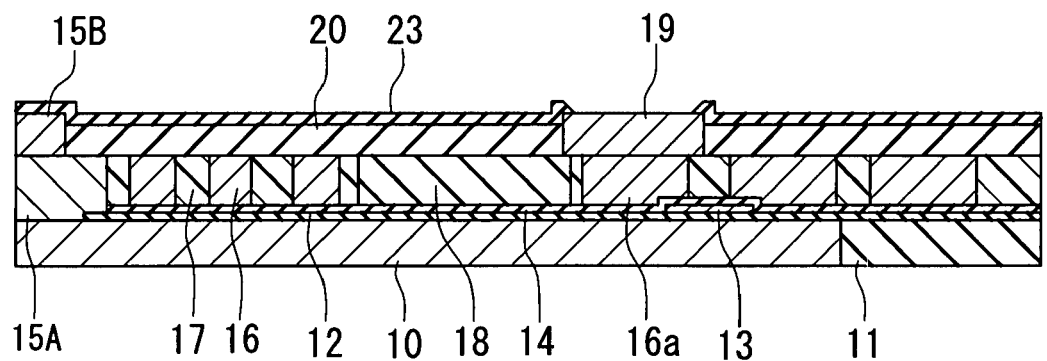
FIG. 7 is a cross-sectional view illustrating a step that follows the step of FIG. 6.

FIG. 7 illustrates the next step. In this step, first, the first gap layer 23 is formed on the entire top surface of the stack of layers of FIG. 6. The first gap layer 23 covers the first top surface portion T1 and the second top surface portion T2. Next, an opening is formed by ion milling, for example, in the region of the first gap layer 23 corresponding to the top surface of the connecting layer 19.

Figure 8:
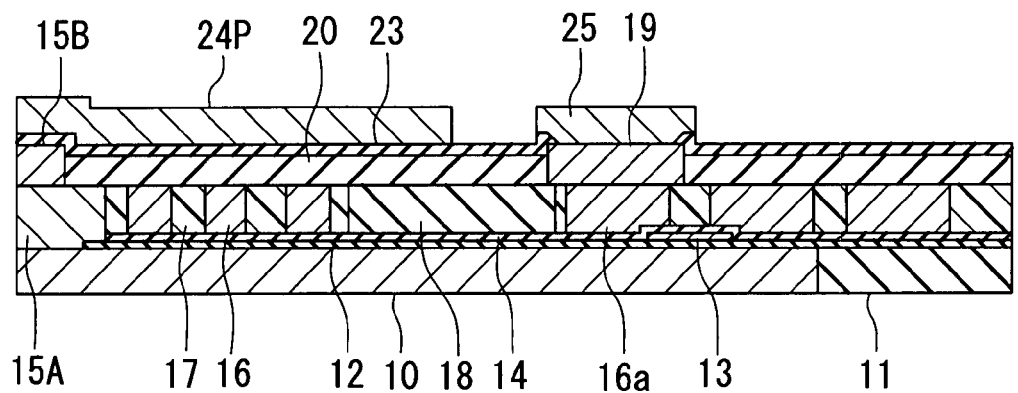
FIG. 8 is a cross-sectional view illustrating a step that follows the step of FIG. 7.

Next, as illustrated in FIG. 8, a plating layer 24P to become the pole layer 24 later and the connecting layer 25 are formed by frame plating.

Figure 9:
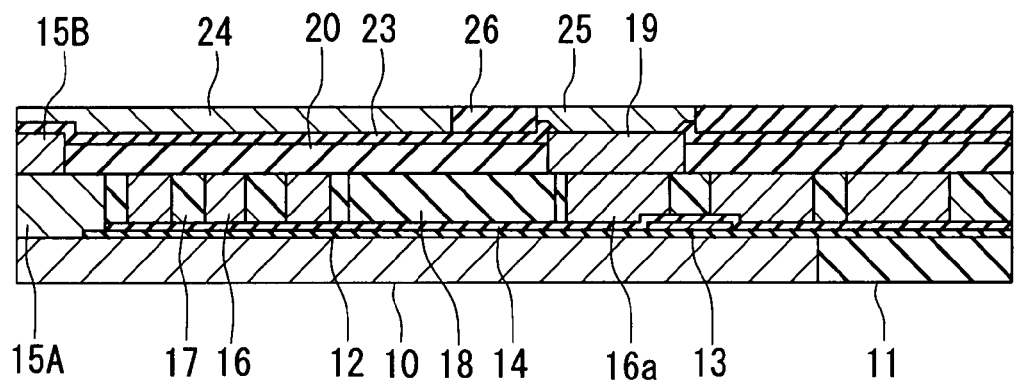
FIG. 9 is a cross-sectional view illustrating a step that follows the step of FIG. 8.

FIG. 9 illustrates the next step. In this step, first, the insulating layer 26 is formed on the entire top surface of the stack of layers of FIG. 8. Next, the insulating layer 26, the plating layer 24P and the connecting layer 25 are polished by CMP, for example, so that the plating layer 24P and the connecting layer 25 are exposed and these layers achieve desired thicknesses, and the top surfaces of the layers 26, 24P and 25 are thereby flattened. The plating layer 24P becomes the pole layer 24 by being polished to achieve its desired thickness.

Figure 10:
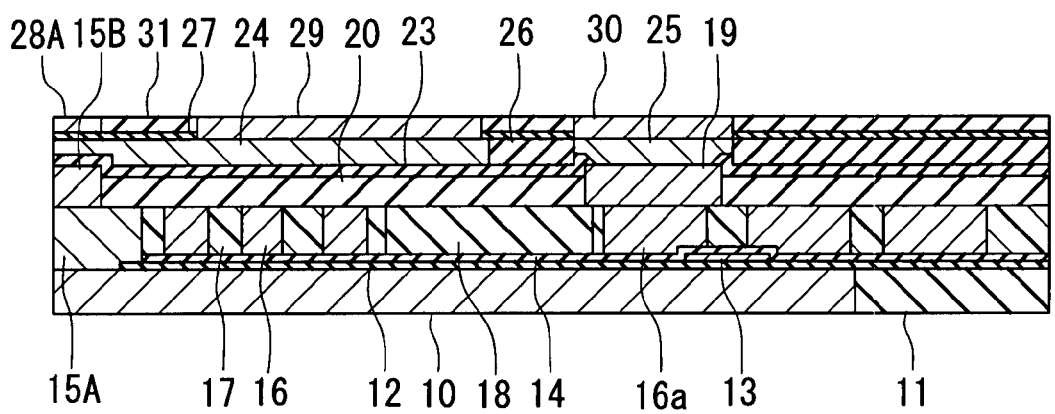
FIG. 10 is a cross-sectional view illustrating a step that follows the step of FIG. 9.

FIG. 10 illustrates the next step. In this step, first, the second gap layer 27 is formed on the entire top surface of the stack of layers of FIG. 9. Next, in the second gap layer 27 the opening for exposing part of the top surface of the pole layer 24 and the opening for exposing the top surface of the connecting layer 25 are formed by ion milling, for example.

Next, the first layer 28A of the second shield 28, the yoke layer 29 and the connecting layer 30 are formed by frame plating, for example. Next, the insulating layer 31 is formed on the entire top surface of the stack of layers. Next, the insulating layer 31, the first layer 28A, the yoke layer 29 and the connecting layer 30 are polished by CMP, for example, so that the first layer 28A, the yoke layer 29 and the connecting layer 30 are exposed and these layers achieve desired thicknesses, and the top surfaces of the layers 31, 28A, 29 and 30 are thereby flattened.

Figure 11:
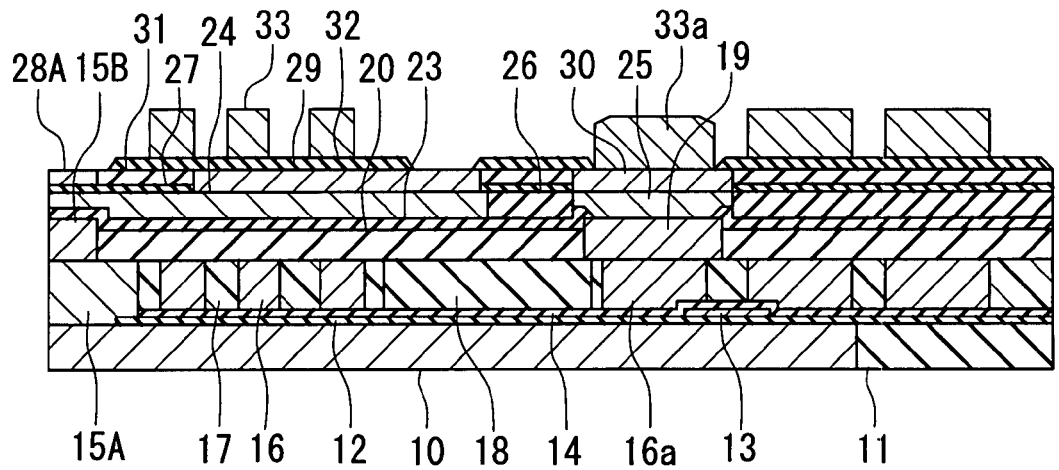
FIG. 11 is a cross-sectional view illustrating a step that follows the step of FIG. 10.

FIG. 11 illustrates the next step. In this step, first, the insulating layer 32 is formed on the yoke layer 29 and the insulating layer 31. The insulating layer 32 may be formed by partially etching an insulating film formed on the entire top surface of the stack of layers of FIG. 10 by ion milling, for example, or may be formed by lift-off. Next, the coil 33 is formed. The connecting portion 33a of the coil 33 is disposed on the connecting layer 30, while the other portion of the coil 33 is disposed on the insulating layer 32.

Figure 12:
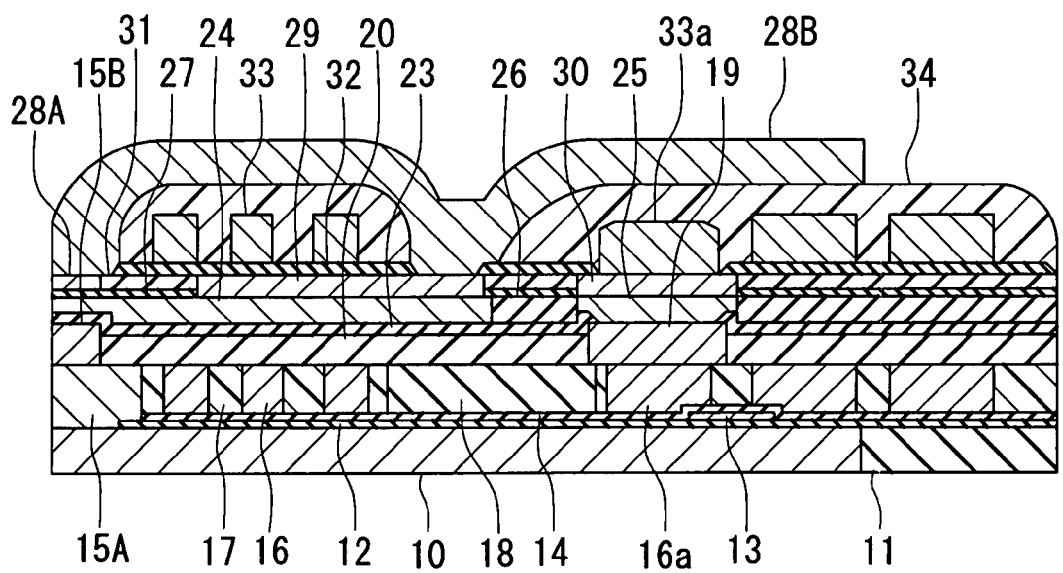
FIG. 12 is a cross-sectional view illustrating a step that follows the step of FIG. 11.

FIG. 12 illustrates the next step. In this step, first, the insulating layer 34 is formed to cover the coil 33. Next, the second layer 28B is formed by frame plating, for example.

Next, the overcoat layer 35 is formed as illustrated in FIG. 1. Wiring, terminals and so on are then formed on the overcoat layer 35. In the embodiment, two terminals connected to the MR element 5, two terminals connected to the coils 16 and 33, and two terminals connected to the heater 13 are formed on the overcoat layer 35. The substructure is thus fabricated.

Next, as previously described, the substructure is cut, the surface to be the medium facing surface 40 is lapped to form the medium facing surface 40, flying rails are formed in the medium facing surface 40, and the slider including the magnetic head is thus completed.

In this embodiment, the pole layer 24 includes the first portion 24C having the end face located in the medium facing surface 40, and the second portion 24D that is adjacent to the first portion 24C and located farther from the medium facing surface 40 than is the first portion 24C, and the second portion 24D has a thickness greater than that of the first portion 24C. As a result, according to the embodiment, it is possible to introduce magnetic flux of great magnitude to the medium facing surface 40 through the pole layer 24 to thereby attain improved write characteristics, while preventing the problems resulting from the skew by making the thickness of the pole layer 24 taken in the medium facing surface 40 smaller.

In the embodiment, as illustrated in FIG. 2, the shape of the combination of the bottom surface B1 of the first portion 24C, the bottom surface B2 of the second portion 24D and the connecting surface C2 conforms to the shape of the combination of the first top surface portion T1, the second top surface portion T2 and the connecting surface C1. As a result, according to the embodiment, it is possible to accurately define the positional relationship between a combination of the first top surface portion T1 of the first shield 15 and the second top surface portion T2 of the nonmagnetic layer 20 and a combination of the bottom surface B1 of the first portion 24C and the bottom surface B2 of the second portion 24D of the pole layer 24. Consequently, it is possible to control the write characteristics accurately.

According to the method of manufacturing the magnetic head of the embodiment, it is possible to form the pole layer 24 including the first portion 24C and the second portion 24D through a simple process. Furthermore, according to the method of the embodiment, it is possible to accurately define the positional relationship between the combination of the first top surface portion T1 of the first shield 15 and the second top surface portion T2 of the nonmagnetic layer 20 and the combination of the bottom surface B1 of the first portion 24C and the bottom surface B2 of the second portion 24D of the pole layer 24 through a simple process.

In the embodiment, the bottom surface B1 of the first portion 24C is substantially perpendicular to the medium facing surface 40, and, at least in the neighborhood of the medium facing surface 40, the top surface of the pole layer 24 is also substantially perpendicular to the medium facing surface 40. As a result, according to the embodiment, it is possible to prevent the thickness of the pole layer 24 taken in the medium facing surface 40 from varying in response to a variation in the position of the medium facing surface 40 when the medium facing surface 40 is formed by polishing. According to the embodiment, it is therefore possible to suppress variations in write characteristics.

The magnetic head of the embodiment has the yoke layer 29 disposed on a region of the pole layer 24 located away from the medium facing surface 40. The second shield 28 is magnetically connected to the pole layer 24 through the yoke layer 29 at a position away from the medium facing surface 40. An end face of the yoke layer 29 closer to the medium facing surface 40 is located farther from the medium facing surface 40 than is the boundary between the first portion 24C and the second portion 24D of the pole layer 24. Therefore, in the embodiment, the cross-sectional area of the magnetic path formed by the pole layer 24 and the yoke layer 29 decreases in two steps as the distance from the medium facing surface 40 decreases. As a result, according to the embodiment, it is possible to introduce magnetic flux effectively to the end face of the pole layer 24 while preventing the magnetic flux from being saturated halfway through the magnetic path. Furthermore, by making the difference in level D4 between the bottom surfaces B1 and B2 smaller than the thickness of the yoke layer 29, it is possible to suppress leakage of magnetic flux from the pole layer 24 to the outside in the neighborhood of the medium facing surface 40.

In the embodiment, the first shield 15 includes the first layer 15A, and the second layer 15B that is disposed between the first layer 15A and the first gap layer 23 so as to touch the first layer 15A and the first gap layer 23. The thickness of each of the first layer 15A and the second layer 15B is smaller than the thickness of the entire first shield 15 without exception. Therefore, it is possible to form both of the first layer 15A and the second layer 15B with higher accuracy, compared with the accuracy of the shape of the first shield 15 that would be obtained in the case where the entire first shield 15 is formed of a single layer. For example, in the case where the first layer 15A and the second layer 15B are each formed by frame plating, it is possible that the thickness of a frame required for forming the first layer 15A and the thickness of a frame required for forming the second layer 15B are smaller than the thickness of a frame that would be required for forming the first shield 15 in the case where the entire first shield 15 is formed of a single layer. Accordingly, it is possible to form both of the first layer 15A and the second layer 15B with high accuracy.

Therefore, according to the embodiment, it is possible to form the first shield 15 with higher accuracy as compared with the case where the entire first shield 15 is formed of a single layer, and as a result, it is possible to control the shape of the first shield 15 accurately. The shape of the second layer 15B of the first shield 15 particularly has a great influence on write characteristics. According to the embodiment, since the shape of the second layer 15B is accurately controllable, it becomes possible for the first shield 15 to exert its function effectively and it is possible to control the write characteristics accurately.

In the embodiment, in the case where the length of the second layer 15B taken in the direction perpendicular to the medium facing surface 40 is smaller than the length of the first layer 15A taken in the direction perpendicular to the medium facing surface 40, it is possible to control the shape of the second layer 15B with higher accuracy.

Figure 13:
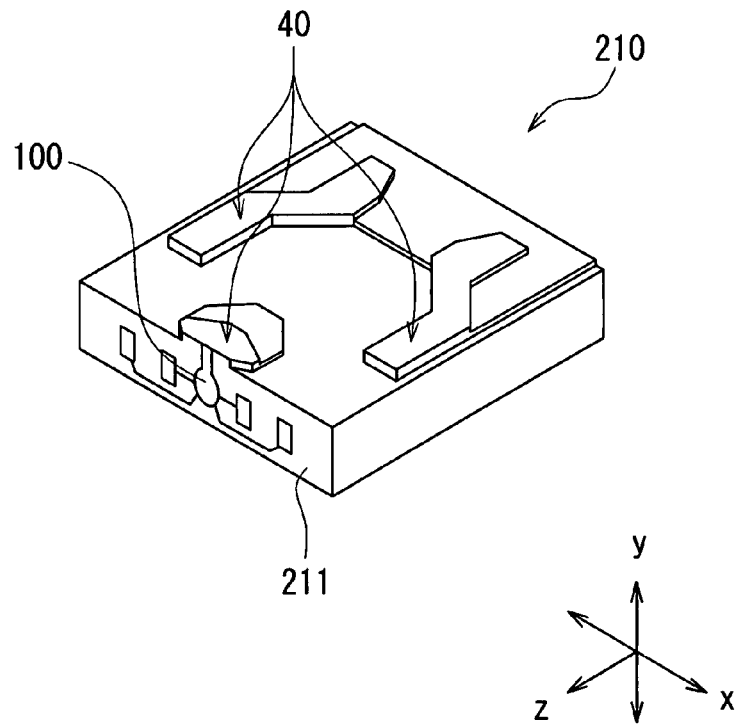
FIG. 13 is a perspective view illustrating an example of appearance of a slider including the magnetic head of the first embodiment of the invention.

A head assembly and a magnetic disk drive of the embodiment will now be described. Reference is now made to FIG. 13 to describe a slider 210 incorporated in the head assembly. In the magnetic disk drive, the slider 210 is placed to face toward a magnetic disk platter that is a circular-plate-shaped recording medium to be driven to rotate. The slider 210 has a base body 211 made up mainly of the substrate 1 and the overcoat layer 35 of FIG. 1. The base body 211 is nearly hexahedron-shaped. One of the six surfaces of the base body 211 faces toward the magnetic disk platter. The medium facing surface 40 is formed in this one of the surfaces. When the magnetic disk platter rotates in the z direction of FIG. 13, an airflow passes between the magnetic disk platter and the slider 210, and a lift is thereby generated below the slider 210 in the y direction of FIG. 13 and exerted on the slider 210. The slider 210 flies over the surface of the magnetic disk platter by means of the lift. The x direction of FIG. 13 is across the tracks of the magnetic disk platter. The magnetic head 100 of the embodiment is formed near the air-outflow-side end (the end located at the lower left of FIG. 13) of the slider 210.

Figure 14:
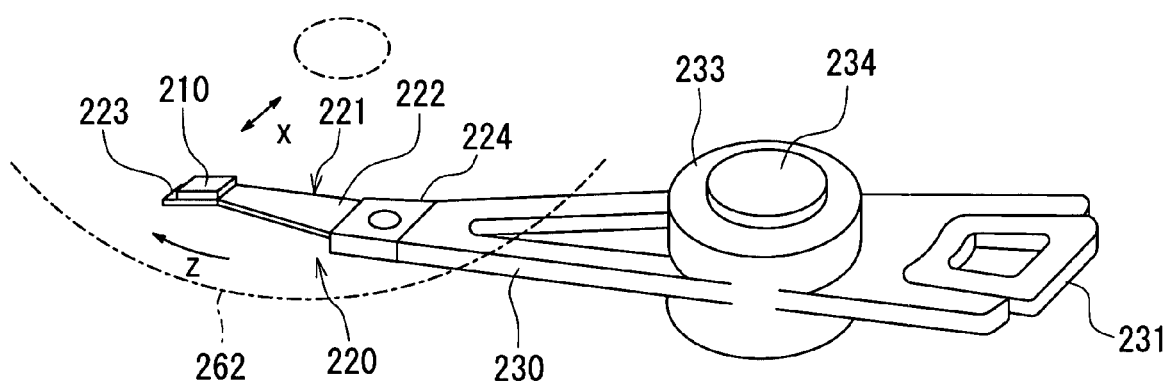
FIG. 14 is a perspective view of a head arm assembly of the first embodiment of the invention.

Reference is now made to FIG. 14 to describe the head assembly of the embodiment. The head assembly of the embodiment has the slider 210 and a supporter that flexibly supports the slider 210. Forms of this head assembly include a head gimbal assembly and a head arm assembly described below.

The head gimbal assembly 220 will be first described. The head gimbal assembly 220 has the slider 210 and a suspension 221 as the supporter that flexibly supports the slider 210. The suspension 221 has a plate-spring-shaped load beam 222 made of stainless steel, for example; a flexure 223 to which the slider 210 is joined, the flexure 223 being located at an end of the load beam 222 and giving an appropriate degree of freedom to the slider 210; and a base plate 224 located at the other end of the load beam 222. The base plate 224 is attached to an arm 230 of an actuator for moving the slider 210 along the x direction across the tracks of the magnetic disk platter 262. The actuator has the arm 230 and a voice coil motor that drives the arm 230. A gimbal section for maintaining the orientation of the slider 210 is provided in the portion of the flexure 223 on which the slider 210 is mounted.

The head gimbal assembly 220 is attached to the arm 230 of the actuator. An assembly including the arm 230 and the head gimbal assembly 220 attached to the arm 230 is called a head arm assembly. An assembly including a carriage having a plurality of arms wherein the head gimbal assembly 220 is attached to each of the arms is called a head stack assembly.

FIG. 14 illustrates the head arm assembly of the embodiment. In the head arm assembly, the head gimbal assembly 220 is attached to an end of the arm 230. A coil 231 that is part of the voice coil motor is fixed to the other end of the arm 230. A bearing 233 is provided in the middle of the arm 230. The bearing 233 is attached to a shaft 234 that rotatably supports the arm 230.

Figure 15:
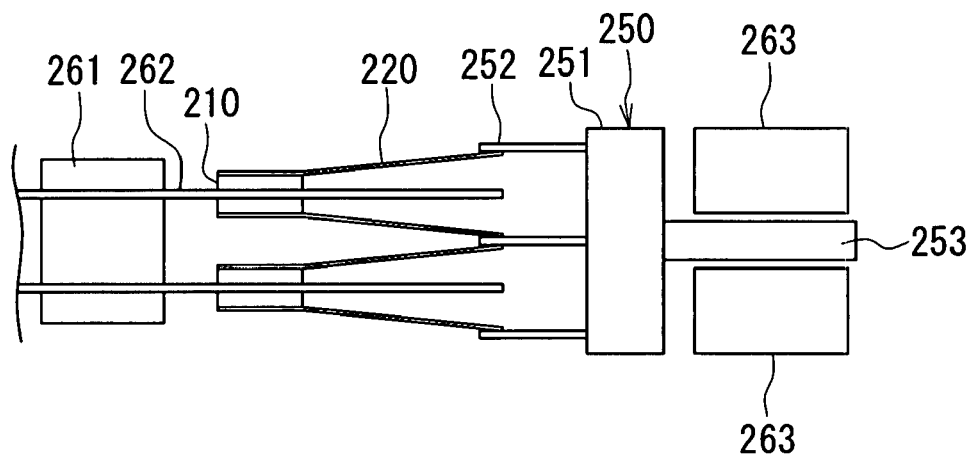
FIG. 15 is an explanatory view for illustrating the main part of a magnetic disk drive of the first embodiment of the invention.
Figure 16:
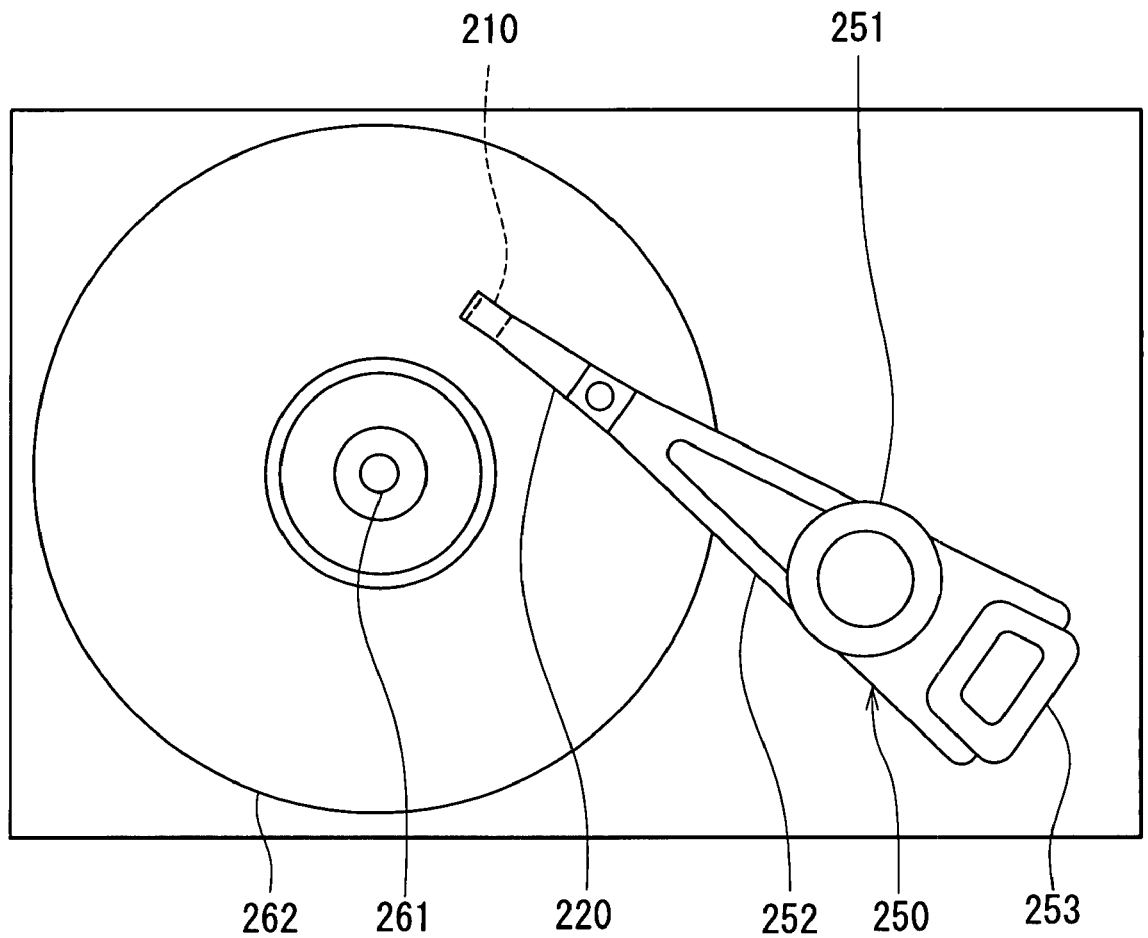
FIG. 16 is a top view of the magnetic disk drive of the first embodiment of the invention.

Reference is now made to FIG. 15 and FIG. 16 to describe an example of the head stack assembly and the magnetic disk drive of the embodiment. FIG. 15 is an explanatory view illustrating the main part of the magnetic disk drive, and FIG. 16 is a top view of the magnetic disk drive. The head stack assembly 250 incorporates a carriage 251 having a plurality of arms 252. A plurality of head gimbal assemblies 220 are attached to the arms 252 such that the assemblies 220 are arranged in the vertical direction with spacing between respective adjacent ones. A coil 253 that is part of the voice coil motor is mounted on the carriage 251 on a side opposite to the arms 252. The head stack assembly 250 is installed in the magnetic disk drive. The magnetic disk drive includes a plurality of magnetic disk platters 262 mounted on a spindle motor 261. Two of the sliders 210 are allocated to each of the platters 262, such that the two sliders 210 are opposed to each other with each of the platters 262 disposed in between. The voice coil motor includes permanent magnets 263 disposed to be opposed to each other, the coil 253 of the head stack assembly 250 being placed between the magnets 263.

The actuator and the head stack assembly 250 except the sliders 210 correspond to the alignment device of the invention, and support the sliders 210 and align them with respect to the magnetic disk platters 262.

In the magnetic disk drive of the embodiment, the actuator moves the slider 210 across the tracks of the magnetic disk platter 262 and aligns the slider 210 with respect to the magnetic disk platter 262. The magnetic head incorporated in the slider 210 writes data on the magnetic disk platter 262 by using the write head, and reads data stored on the magnetic disk platter 262 by using the read head.

The head assembly and the magnetic disk drive of the embodiment exhibit effects similar to those of the magnetic head of the embodiment described previously.

Second Embodiment

Figure 17:
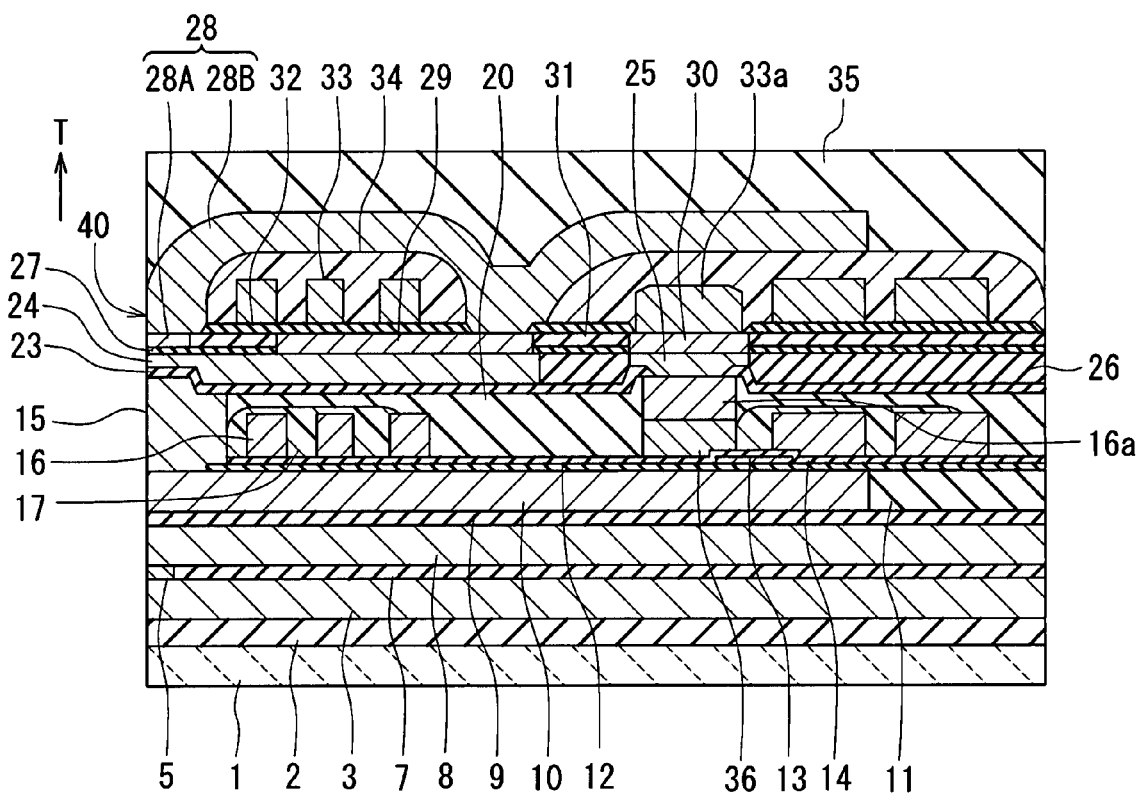
FIG. 17 is a cross-sectional view illustrating the configuration of a magnetic head of a second embodiment of the invention.
Figure 18:
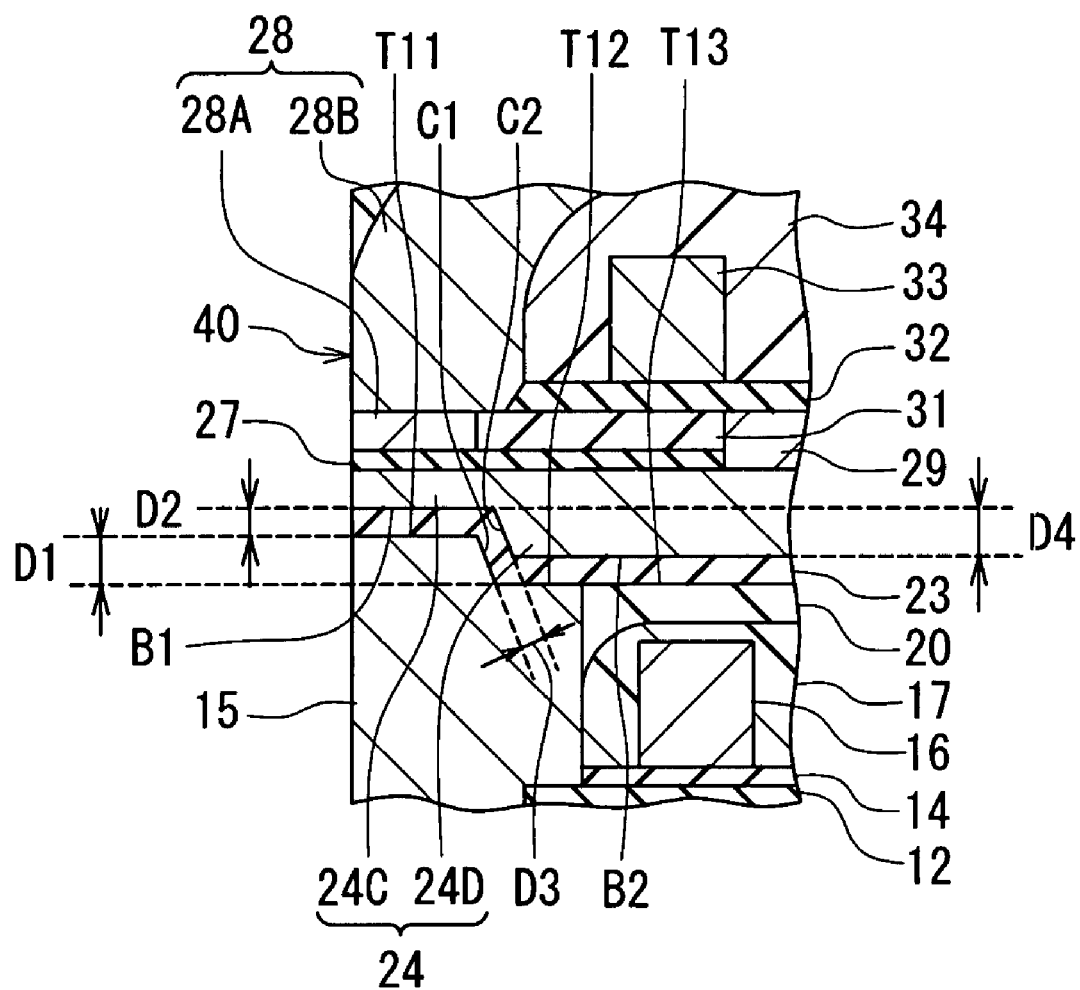
FIG. 18 is a cross-sectional view illustrating the main part of the magnetic head of the second embodiment of the invention.

A second embodiment of the invention will now be described. Reference is first made to FIG. 17 and FIG. 18 to describe the configuration of a magnetic head of the second embodiment. FIG. 17 is a cross-sectional view illustrating the configuration of the magnetic head. FIG. 18 is a cross-sectional view illustrating the main part of the magnetic head. FIG. 17 illustrates a cross section perpendicular to the medium facing surface and the top surface of the substrate. In FIG. 17 the arrow marked with T shows the direction of travel of the recording medium.

In the second embodiment, the first shield 15 is formed of a single layer disposed on the magnetic layer 10. As illustrated in FIG. 18, the first shield 15 of the second embodiment has a first top surface portion T11 that is opposed to the bottom surface B1 of the first portion 24C of the pole layer 24 with the first gap layer 23 in between, and a second top surface portion T12 that is opposed to a part of the bottom surface B2 of the second portion 24D of the pole layer 24 with the first gap layer 23 in between. The nonmagnetic layer 20 has a third top surface portion T13 that is opposed to another part of the bottom surface B2 of the second portion 24D with the first gap layer 23 in between. A difference in level D1 is formed between the first top surface portion T11 and the second top surface portion T12 such that the second top surface portion T12 is located closer to the substrate than is the first top surface portion T11. There is no difference in level between the second top surface portion T12 and the third top surface portion T13.

The first shield 15 further has a connecting surface C1 that connects the first top surface portion T11 and the second top surface portion T12 to each other. As in the first embodiment, the pole layer 24 has the connecting surface C2 that connects the bottom surface B1 of the first portion 24C and the bottom surface B2 of the second portion 24D to each other. In the example illustrated in FIG. 18, the connecting surfaces C1 and C2 are inclined such that the distance from the medium facing surface 40 increases with decreasing distance from the substrate 1. Alternatively, the connecting surfaces C1 and C2 may be parallel to the medium facing surface 40, as in the first embodiment.

In the second embodiment, the mutual relationship among the first top surface portion T11, the second top surface portion T12, the bottom surface B1 of the first portion 24C, the bottom surface B2 of the second portion 24D, and the connecting surfaces C1 and C2 is the same as the relationship in the first embodiment, except that the first top surface portion T1 and the second top surface portion T2 of the first embodiment are replaced with the first top surface portion T11 and the second top surface portion 12. The relationship among D1, D2, D3 and D4 in the second embodiment is also the same as that in the first embodiment.

In the second embodiment, a raising layer 36 is provided between the connecting portion 16a of the coil 16 and the insulating film 14. The material of the raising layer 36 may be an insulating material or a conductive material. In the second embodiment the connecting layer 19 of the first embodiment is not provided, and the connecting layer 25 is disposed on the connecting portion 16a.

Reference is now made to FIG. 19 to FIG. 22 to describe a method of manufacturing the magnetic head of the second embodiment. The method of manufacturing the magnetic head of the second embodiment includes the steps up to the step of forming the insulating film 14 that are the same as those of the first embodiment.

Figure 19:
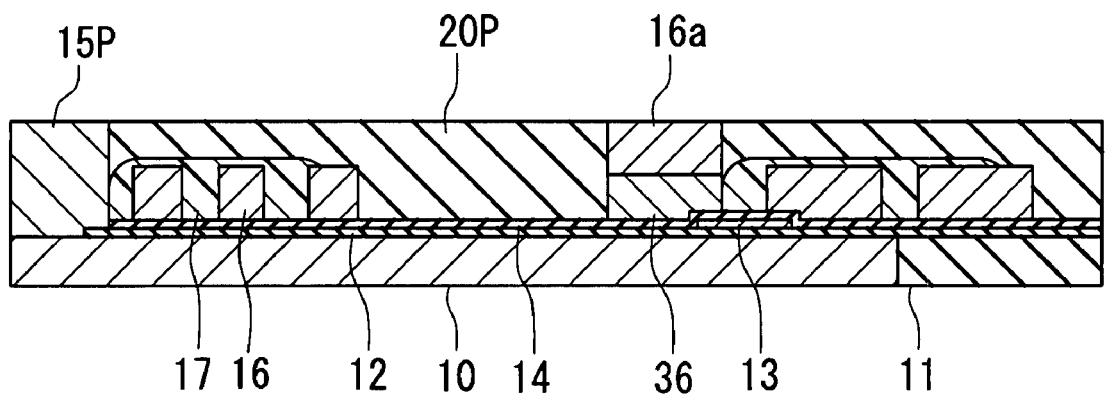
FIG. 19 is a cross-sectional view illustrating a step of a method of manufacturing the magnetic head of the second embodiment of the invention.

FIG. 19 illustrates the next step. In this step, first, the raising layer 36 is formed on the insulating film 14. Next, a layer for shield 15P is formed on the magnetic layer 10 by frame plating, for example. The layer for shield 15P will be partially etched later to thereby become the first shield 15. Next, the coil 16 is formed by frame plating, for example. The connecting portion 16a of the coil 16 is disposed on the raising layer 36 while the other portion of the coil 16 is disposed on the insulating film 14. Next, the insulating layer 17 is formed such that the space between the coil 16 and the layer for shield 15P and the space between respective adjacent turns of the coil 16 are filled with the insulating layer 17. Next, the layer to be etched 20P, which will be partially etched later to thereby become the nonmagnetic layer 20, is formed on the entire top surface of the stack of layers. Next, the layer to be etched 20P is polished by CMP, for example, so that the layer for shield 15P and the connecting portion 16a are exposed, and the top surfaces of the layer for shield 15P, the connecting portion 16a and the layer to be etched 20P are thereby flattened.

Figure 20:
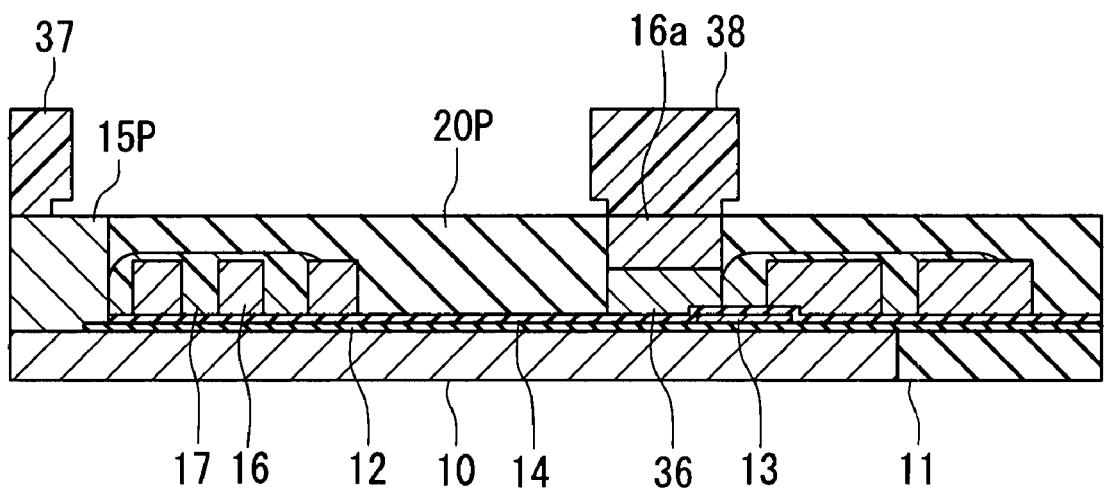
FIG. 20 is a cross-sectional view illustrating a step that follows the step of FIG. 19.

Next, as illustrated in FIG. 20, masks 37 and 38 are formed by patterning a photoresist layer by photolithography, for example. The mask 37 is disposed on a portion of the top surface of the layer for shield 15P. The mask 38 is disposed on the top surface of the connecting portion 16a.

Figure 21:
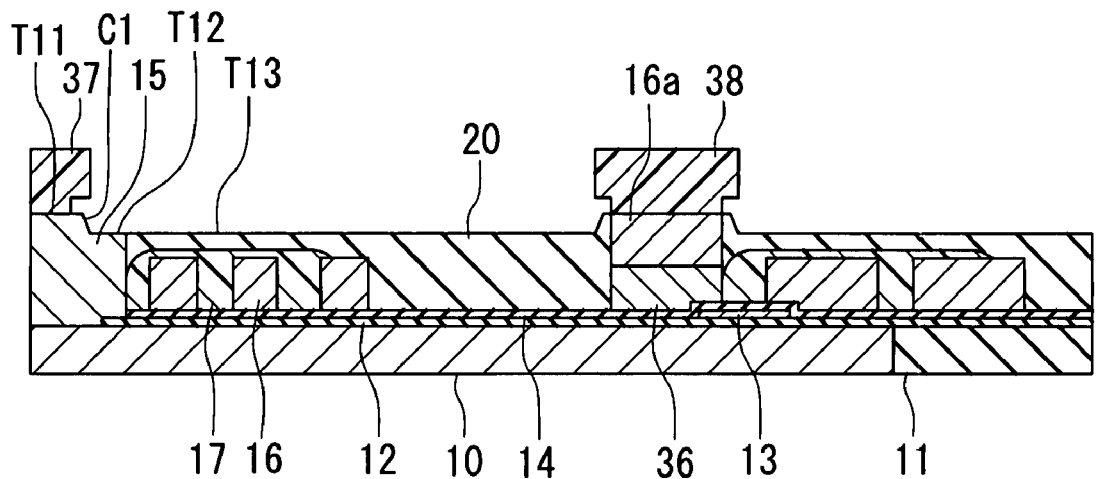
FIG. 21 is a cross-sectional view illustrating a step that follows the step of FIG. 20.

Next, as illustrated in FIG. 21, a portion of the layer for shield 15P and a portion of the layer to be etched 20P are selectively etched by ion milling or reactive ion etching, for example. As a result, the first top surface portion T11, the second top surface portion T12 and the connecting surface C1 are formed in the top surface of the layer for shield 15P, and the layer for shield 15P thereby becomes the first shield 15. Furthermore, the third top surface portion T13 is formed in the top surface of the layer to be etched 20P, and the layer to be etched 20P thereby becomes the nonmagnetic layer 20. In this step, the connecting portion 16a is not etched since it is protected with the mask 38. Next, the masks 37 and 38 are removed.

Figure 22:
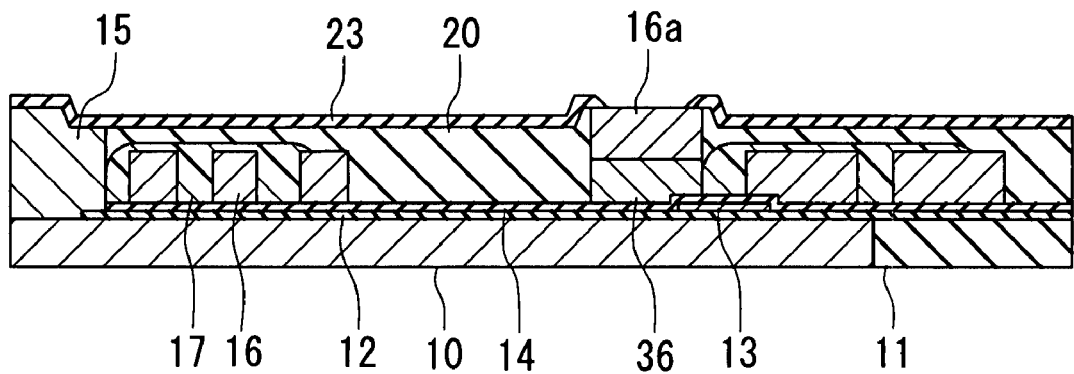
FIG. 22 is a cross-sectional view illustrating a step that follows the step of FIG. 21.

FIG. 22 illustrates the next step. In this step, first, the first gap layer 23 is formed on the entire top surface of the stack of layers. The first gap layer 23 covers the first to third top surface portions T11, T12 and T13. Next, an opening is formed by ion milling, for example, in a region of the first gap layer 23 corresponding to the top surface of the connecting portion 16a.

According to the second embodiment, the steps that follow are the same as those described with reference to FIG. 8 to FIG. 12 in the first embodiment.

In the second embodiment, as illustrated in FIG. 18, the combination of the bottom surface B1 of the first portion 24C, the bottom surface B2 of the second portion 24D and the connecting surface C2 has a shape conforming to the shape of a combination of the first top surface portion T11, the second top surface portion T12 and the connecting surface C1. As a result, according to the second embodiment, it is possible to accurately define the positional relationship between a combination of the first top surface portion T11 and the second top surface portion T12 of the first shield 15 and a combination of the bottom surface B1 of the first portion 24C and the bottom surface B2 of the second portion 24D of the pole layer 24. Consequently, it is possible to control the write characteristics accurately.

According to the method of manufacturing the magnetic head of the second embodiment, it is possible to form the pole layer 24 including the first portion 24C and the second portion 24D through a simple process. Furthermore, according to the method of manufacturing the magnetic head of the second embodiment, it is possible to accurately define the positional relationship between the combination of the first top surface portion T11 and the second top surface portion T12 of the first shield 15 and the combination of the bottom surface B1 of the first portion 24C and the bottom surface B2 of the second portion 24D of the pole layer 24 through a simple process.

In the second embodiment, the first top surface portion T11, the second top surface portion T12 and the connecting surface C1 are formed by etching a portion of the layer for shield 15P near the top surface thereof. Therefore, according to the embodiment, it is possible to accurately control the shape of a portion of the first shield 15 near the top surface thereof that has a great influence on write characteristics in particular. As a result, according to the embodiment, it is possible for the first shield 15 to exert its function effectively and it is possible to control the write characteristics accurately.

The remainder of configuration, operation and effects of the second embodiment are similar to those of the first embodiment.

The present invention is not limited to the foregoing embodiments but various modifications are possible. For example, the first shield 15 may include three or more layers.

While the foregoing embodiments have been described with reference to a magnetic head having a structure in which the read head is formed on the base body and the write head is stacked on the read head, the read head and the write head may be stacked in the reverse order.

It is apparent that the present invention can be carried out in various forms and modifications in the light of the foregoing descriptions. Accordingly, within the scope of the following claims and equivalents thereof, the present invention can be carried out in forms other than the foregoing most preferred embodiments.

What is claimed is:

1. A magnetic head for perpendicular magnetic recording comprising:
a medium facing surface that faces toward a recording medium;
a coil that generates a magnetic field corresponding to data to be written on the recording medium;
a pole layer that has an end face located in the medium facing surface, allows a magnetic flux corresponding to the magnetic field generated by the coil to pass therethrough and generates a write magnetic field for writing the data on the recording medium by means of a perpendicular magnetic recording system;
a first shield made of a magnetic material and having an end face located in the medium facing surface at a position backward of the end face of the pole layer along a direction of travel of the recording medium;
a nonmagnetic layer made of a nonmagnetic material and disposed around the first shield;
a first gap layer made of a nonmagnetic material, disposed between the pole layer and each of the first shield and the nonmagnetic layer, and having an end face located in the medium facing surface;
a second shield made of a magnetic material and having an end face located in the medium facing surface at a position forward of the end face of the pole layer along the direction of travel of the recording medium;
a second gap layer made of a nonmagnetic material, disposed between the second shield and the pole layer and having an end face located in the medium facing surface; and
a substrate on which the coil, the pole layer, the first and the second shield, and the first and the second gap layer are stacked,
the first shield being located closer to the substrate than is the second shield, wherein:
the pole layer includes: a first portion having the end face located in the medium facing surface; and a second portion that is adjacent to the first portion and located farther from the medium facing surface than is the first portion;
the second portion has a thickness greater than that of the first portion;
each of the first portion and the second portion has a bottom surface that is closer to the substrate;
the bottom surface of the second portion is located closer to the substrate than is the bottom surface of the first portion;
the first shield has a first top surface portion that is opposed to the bottom surface of the first portion with the first gap layer in between;
the nonmagnetic layer has a second top surface portion that is opposed to the bottom surface of the second portion with the first gap layer in between; and
a difference in level is formed between the first top surface portion and the second top surface portion such that the second top surface portion is located closer to the substrate than is the first top surface portion.

2. The magnetic head according to claim 1, wherein the difference in level between the first top surface portion and the second top surface portion and the difference between the bottom surface of the first portion and the bottom surface of the second portion in distance from the substrate are substantially equal.

3. The magnetic head according to claim 1, wherein the difference in level between the first top surface portion and the second top surface portion and the difference between the bottom surface of the first portion and the bottom surface of the second portion in distance from the substrate are both within a range of 0.02 to 0.3 µm.

4. The magnetic head according to claim 1, wherein:
the first shield has a connecting surface that connects the first top surface portion and the second top surface portion to each other;
the pole layer has a connecting surface that connects the bottom surface of the first portion and the bottom surface of the second portion to each other; and
the distance between the end face of the pole layer and the end face of the first shield in the medium facing surface and the distance between the connecting surface of the first shield and the connecting surface of the pole layer are substantially equal.

5. The magnetic head according to claim 1, wherein:
the first shield has a connecting surface that connects the first top surface portion and the second top surface portion to each other;
the pole layer has a connecting surface that connects the bottom surface of the first portion and the bottom surface of the second portion to each other; and
the distance between the end face of the pole layer and the end face of the first shield in the medium facing surface and the distance between the connecting surface of the first shield and the connecting surface of the pole layer are both within a range of 0.05 to 0.7 µm.

6. The magnetic head according to claim 1, wherein the first shield includes a first layer, and a second layer that is disposed between the first layer and the first gap layer.

7. The magnetic head according to claim 6, wherein a length of the second layer taken in a direction perpendicular to the medium facing surface is smaller than a length of the first layer taken in the direction perpendicular to the medium facing surface.

8. The magnetic head according to claim 1, wherein the second shield is magnetically connected to the pole layer at a position away from the medium facing surface, and the coil includes a portion that passes through a space surrounded by the pole layer and the second shield.

9. The magnetic head according to claim 8, further comprising a yoke layer connected to a top surface of the second portion of the pole layer that is opposite to the bottom surface thereof, wherein:
- the second shield is connected to the yoke layer at a position away from the medium facing surface; and
- an end face of the yoke layer closer to the medium facing surface is located father from the medium facing surface than is the boundary between the first portion and the second portion.

10. A head assembly comprising: a slider including a magnetic head for perpendicular magnetic recording and disposed to face toward a recording medium; and a supporter flexibly supporting the slider,
the magnetic head comprising:
- a medium facing surface that faces toward the recording medium;
- a coil that generates a magnetic field corresponding to data to be written on the recording medium;
- a pole layer that has an end face located in the medium facing surface, allows a magnetic flux corresponding to the magnetic field generated by the coil to pass therethrough and generates a write magnetic field for writing the data on the recording medium by means of a perpendicular magnetic recording system;
- a first shield made of a magnetic material and having an end face located in the medium facing surface at a position backward of the end face of the pole layer along a direction of travel of the recording medium;
- a nonmagnetic layer made of a nonmagnetic material and disposed around the first shield;
- a first gap layer made of a nonmagnetic material, disposed between the pole layer and each of the first shield and the nonmagnetic layer, and having an end face located in the medium facing surface;
- a second shield made of a magnetic material and having an end face located in the medium facing surface at a position forward of the end face of the pole layer along the direction of travel of the recording medium;
- a second gap layer made of a nonmagnetic material, disposed between the second shield and the pole layer and having an end face located in the medium facing surface; and
- a substrate on which the coil, the pole layer, the first and the second shield, and the first and the second gap layer are stacked, wherein:
- the first shield is located closer to the substrate than is the second shield;
- the pole layer includes: a first portion having the end face located in the medium facing surface; and a second portion that is adjacent to the first portion and located farther from the medium facing surface than is the first portion;
- the second portion has a thickness greater than that of the first portion;
- each of the first portion and the second portion has a bottom surface that is closer to the substrate;
- the bottom surface of the second portion is located closer to the substrate than is the bottom surface of the first portion;
- the first shield has a first top surface portion that is opposed to the bottom surface of the first portion with the first gap layer in between;
- the nonmagnetic layer has a second top surface portion that is opposed to the bottom surface of the second portion with the first gap layer in between; and
- a difference in level is formed between the first top surface portion and the second top surface portion such that the second top surface portion is located closer to the substrate than is the first top surface portion.

11. A magnetic disk drive comprising: a slider including a magnetic head for perpendicular magnetic recording and disposed to face toward a recording medium that is driven to rotate; and an alignment device supporting the slider and aligning the slider with respect to the recording medium,
the magnetic head comprising:
- a medium facing surface that faces toward the recording medium;
- a coil that generates a magnetic field corresponding to data to be written on the recording medium;
- a pole layer that has an end face located in the medium facing surface, allows a magnetic flux corresponding to the magnetic field generated by the coil to pass therethrough and generates a write magnetic field for writing the data on the recording medium by means of a perpendicular magnetic recording system;
- a first shield made of a magnetic material and having an end face located in the medium facing surface at a position backward of the end face of the pole layer along a direction of travel of the recording medium;
- a nonmagnetic layer made of a nonmagnetic material and disposed around the first shield;
- a first gap layer made of a nonmagnetic material, disposed between the pole layer and each of the first shield and the nonmagnetic layer, and having an end face located in the medium facing surface;
- a second shield made of a magnetic material and having an end face located in the medium facing surface at a position forward of the end face of the pole layer along the direction of travel of the recording medium;
- a second gap layer made of a nonmagnetic material, disposed between the second shield and the pole layer and having an end face located in the medium facing surface; and
- a substrate on which the coil, the pole layer, the first and the second shield, and the first and the second gap layer are stacked, wherein:
- the first shield is located closer to the substrate than is the second shield;
- the pole layer includes: a first portion having the end face located in the medium facing surface; and a second portion that is adjacent to the first portion and located farther from the medium facing surface than is the first portion;
- the second portion has a thickness greater than that of the first portion;
- each of the first portion and the second portion has a bottom surface that is closer to the substrate;
- the bottom surface of the second portion is located closer to the substrate than is the bottom surface of the first portion;
- the first shield has a first top surface portion that is opposed to the bottom surface of the first portion with the first gap layer in between;

the nonmagnetic layer has a second top surface portion that is opposed to the bottom surface of the second portion with the first gap layer in between; and a difference in level is formed between the first top surface portion and the second top surface portion such that the second top surface portion is located closer to the substrate than is the first top surface portion.

12. A method of manufacturing a magnetic head for perpendicular magnetic recording, the magnetic head comprising:

a medium facing surface that faces toward a recording medium;

a coil that generates a magnetic field corresponding to data to be written on the recording medium;

a pole layer that has an end face located in the medium facing surface, allows a magnetic flux corresponding to the magnetic field generated by the coil to pass therethrough and generates a write magnetic field for writing the data on the recording medium by means of a perpendicular magnetic recording system;

a first shield made of a magnetic material and having an end face located in the medium facing surface at a position backward of the end face of the pole layer along a direction of travel of the recording medium;

a nonmagnetic layer made of a nonmagnetic material and disposed around the first shield;

a first gap layer made of a nonmagnetic material, disposed between the pole layer and each of the first shield and the nonmagnetic layer, and having an end face located in the medium facing surface;

a second shield made of a magnetic material and having an end face located in the medium facing surface at a position forward of the end face of the pole layer along the direction of travel of the recording medium;

a second gap layer made of a nonmagnetic material, disposed between the second shield and the pole layer and having an end face located in the medium facing surface; and a substrate on which the coil, the pole layer, the first and the second shield, and the first and the second gap layer are stacked, wherein:

the first shield is located closer to the substrate than is the second shield;

the pole layer includes: a first portion having the end face located in the medium facing surface; and a second portion that is adjacent to the first portion and located farther from the medium facing surface than is the first portion;

the second portion has a thickness greater than that of the first portion;

each of the first portion and the second portion has a bottom surface that is closer to the substrate;

the bottom surface of the second portion is located closer to the substrate than is the bottom surface of the first portion;

the first shield has a first top surface portion that is opposed to the bottom surface of the first portion with the first gap layer in between;

the nonmagnetic layer has a second top surface portion that is opposed to the bottom surface of the second portion with the first gap layer in between; and a difference in level is formed between the first top surface portion and the second top surface portion such that the second top surface portion is located closer to the substrate than is the first top surface portion, the method comprising the steps of:

forming the first shield having the first top surface portion;

forming a layer to be etched that will be partially etched later to thereby become the nonmagnetic layer;

partially etching the layer to be etched so that the second top surface portion is formed in a top surface of the layer to be etched and the layer to be etched thereby becomes the nonmagnetic layer;

forming the first gap layer to cover the first top surface portion and the second top surface portion;

forming the pole layer on the first gap layer;

forming the second gap layer after the pole layer is formed;

forming the second shield after the second gap layer is formed; and forming the coil.

13. A magnetic head for perpendicular magnetic recording comprising:

a medium facing surface that faces toward a recording medium;

a coil that generates a magnetic field corresponding to data to be written on the recording medium;

a pole layer that has an end face located in the medium facing surface, allows a magnetic flux corresponding to the magnetic field generated by the coil to pass therethrough and generates a write magnetic field for writing the data on the recording medium by means of a perpendicular magnetic recording system;

a first shield made of a magnetic material and having an end face located in the medium facing surface at a position backward of the end face of the pole layer along a direction of travel of the recording medium;

a nonmagnetic layer made of a nonmagnetic material and disposed around the first shield;

a first gap layer made of a nonmagnetic material, disposed between the pole layer and each of the first shield and the nonmagnetic layer, and having an end face located in the medium facing surface;

a second shield made of a magnetic material and having an end face located in the medium facing surface at a position forward of the end face of the pole layer along the direction of travel of the recording medium;

a second gap layer made of a nonmagnetic material, disposed between the second shield and the pole layer and having an end face located in the medium facing surface; and a substrate on which the coil, the pole layer, the first and the second shield, and the first and the second gap layer are stacked, the first shield being located closer to the substrate than is the second shield, wherein:

the pole layer includes: a first portion having the end face located in the medium facing surface; and a second portion that is adjacent to the first portion and located farther from the medium facing surface than is the first portion;

the second portion has a thickness greater than that of the first portion;

each of the first portion and the second portion has a bottom surface that is closer to the substrate;

the bottom surface of the second portion is located closer to the substrate than is the bottom surface of the first portion;

the first shield has a first top surface portion that is opposed to the bottom surface of the first portion with the first gap layer in between, and a second top surface portion that is opposed to a part of the bottom surface of the second portion with the first gap layer in between;

the nonmagnetic layer has a third top surface portion that is opposed to another part of the bottom surface of the second portion with the first gap layer in between; and a difference in level is formed between the first top surface portion and the second top surface portion of the first shield such that the second top surface portion is located closer to the substrate than is the first top surface portion.

14. The magnetic head according to claim 13, wherein the difference in level between the first top surface portion and the second top surface portion and the difference between the bottom surface of the first portion and the bottom surface of the second portion in distance from the substrate are substantially equal.

15. The magnetic head according to claim 13, wherein the difference in level between the first top surface portion and the second top surface portion and the difference between the bottom surface of the first portion and the bottom surface of the second portion in distance from the substrate are both within a range of 0.02 to 0.3 μm.

16. The magnetic head according to claim 13, wherein:
the first shield has a connecting surface that connects the first top surface portion and the second top surface portion to each other;
the pole layer has a connecting surface that connects the bottom surface of the first portion and the bottom surface of the second portion to each other; and
the distance between the end face of the pole layer and the end face of the first shield in the medium facing surface and the distance between the connecting surface of the first shield and the connecting surface of the pole layer are substantially equal.

17. The magnetic head according to claim 13, wherein:
the first shield has a connecting surface that connects the first top surface portion and the second top surface portion to each other;
the pole layer has a connecting surface that connects the bottom surface of the first portion and the bottom surface of the second portion to each other; and
the distance between the end face of the pole layer and the end face of the first shield in the medium facing surface and the distance between the connecting surface of the first shield and the connecting surface of the pole layer are both within a range of 0.05 to 0.7 μm.

18. The magnetic head according to claim 13, wherein the second shield is magnetically connected to the pole layer at a position away from the medium facing surface, and the coil includes a portion that passes through a space surrounded by the pole layer and the second shield.

19. The magnetic head according to claim 18, further comprising a yoke layer connected to a top surface of the second portion of the pole layer that is opposite to the bottom surface thereof, wherein:
the second shield is connected to the yoke layer at a position away from the medium facing surface; and
an end face of the yoke layer closer to the medium facing surface is located father from the medium facing surface than is the boundary between the first portion and the second portion.

20. A head assembly comprising: a slider including a magnetic head for perpendicular magnetic recording and disposed to face toward a recording medium; and a supporter flexibly supporting the slider,
the magnetic head comprising:
a medium facing surface that faces toward the recording medium;
a coil that generates a magnetic field corresponding to data to be written on the recording medium;
a pole layer that has an end face located in the medium facing surface, allows a magnetic flux corresponding to the magnetic field generated by the coil to pass therethrough and generates a write magnetic field for writing the data on the recording medium by means of a perpendicular magnetic recording system;
a first shield made of a magnetic material and having an end face located in the medium facing surface at a position backward of the end face of the pole layer along a direction of travel of the recording medium;
a nonmagnetic layer made of a nonmagnetic material and disposed around the first shield;
a first gap layer made of a nonmagnetic material, disposed between the pole layer and each of the first shield and the nonmagnetic layer, and having an end face located in the medium facing surface;
a second shield made of a magnetic material and having an end face located in the medium facing surface at a position forward of the end face of the pole layer along the direction of travel of the recording medium;
a second gap layer made of a nonmagnetic material, disposed between the second shield and the pole layer and having an end face located in the medium facing surface; and
a substrate on which the coil, the pole layer, the first and the second shield, and the first and the second gap layer are stacked, wherein:
the first shield is located closer to the substrate than is the second shield;
the pole layer includes: a first portion having the end face located in the medium facing surface; and a second portion that is adjacent to the first portion and located farther from the medium facing surface than is the first portion;
the second portion has a thickness greater than that of the first portion;
each of the first portion and the second portion has a bottom surface that is closer to the substrate;
the bottom surface of the second portion is located closer to the substrate than is the bottom surface of the first portion;
the first shield has a first top surface portion that is opposed to the bottom surface of the first portion with the first gap layer in between, and a second top surface portion that is opposed to a part of the bottom surface of the second portion with the first gap layer in between;
the nonmagnetic layer has a third top surface portion that is opposed to another part of the bottom surface of the second portion with the first gap layer in between; and
a difference in level is formed between the first top surface portion and the second top surface portion of the first shield such that the second top surface portion is located closer to the substrate than is the first top surface portion.

21. A magnetic disk drive comprising: a slider including a magnetic head for perpendicular magnetic recording and disposed to face toward a recording medium that is driven to rotate; and an alignment device supporting the slider and aligning the slider with respect to the recording medium,
the magnetic head comprising:
a medium facing surface that faces toward the recording medium;
a coil that generates a magnetic field corresponding to data to be written on the recording medium;
a pole layer that has an end face located in the medium facing surface, allows a magnetic flux corresponding to the magnetic field generated by the coil to pass therethrough and generates a write magnetic field for writing the data on the recording medium by means of a perpendicular magnetic recording system;

a first shield made of a magnetic material and having an end face located in the medium facing surface at a position backward of the end face of the pole layer along a direction of travel of the recording medium;

a nonmagnetic layer made of a nonmagnetic material and disposed around the first shield;

a first gap layer made of a nonmagnetic material, disposed between the pole layer and each of the first shield and the nonmagnetic layer, and having an end face located in the medium facing surface;

a second shield made of a magnetic material and having an end face located in the medium facing surface at a position forward of the end face of the pole layer along the direction of travel of the recording medium;

a second gap layer made of a nonmagnetic material, disposed between the second shield and the pole layer and having an end face located in the medium facing surface; and a substrate on which the coil, the pole layer, the first and the second shield, and the first and the second gap layer are stacked, wherein:

the first shield is located closer to the substrate than is the second shield;

the pole layer includes: a first portion having the end face located in the medium facing surface; and a second portion that is adjacent to the first portion and located farther from the medium facing surface than is the first portion;

the second portion has a thickness greater than that of the first portion;

each of the first portion and the second portion has a bottom surface that is closer to the substrate;

the bottom surface of the second portion is located closer to the substrate than is the bottom surface of the first portion;

the first shield has a first top surface portion that is opposed to the bottom surface of the first portion with the first gap layer in between, and a second top surface portion that is opposed to a part of the bottom surface of the second portion with the first gap layer in between;

the nonmagnetic layer has a third top surface portion that is opposed to another part of the bottom surface of the second portion with the first gap layer in between; and a difference in level is formed between the first top surface portion and the second top surface portion of the first shield such that the second top surface portion is located closer to the substrate than is the first top surface portion.

22. A method of manufacturing a magnetic head for perpendicular magnetic recording, the magnetic head comprising:

a medium facing surface that faces toward a recording medium;

a coil that generates a magnetic field corresponding to data to be written on the recording medium;

a pole layer that has an end face located in the medium facing surface, allows a magnetic flux corresponding to the magnetic field generated by the coil to pass therethrough and generates a write magnetic field for writing the data on the recording medium by means of a perpendicular magnetic recording system;

a first shield made of a magnetic material and having an end face located in the medium facing surface at a position backward of the end face of the pole layer along a direction of travel of the recording medium;

a nonmagnetic layer made of a nonmagnetic material and disposed around the first shield;

a first gap layer made of a nonmagnetic material, disposed between the pole layer and each of the first shield and the nonmagnetic layer, and having an end face located in the medium facing surface;

a second shield made of a magnetic material and having an end face located in the medium facing surface at a position forward of the end face of the pole layer along the direction of travel of the recording medium;

a second gap layer made of a nonmagnetic material, disposed between the second shield and the pole layer and having an end face located in the medium facing surface; and a substrate on which the coil, the pole layer, the first and the second shield, and the first and the second gap layer are stacked, wherein:

the first shield is located closer to the substrate than is the second shield;

the pole layer includes: a first portion having the end face located in the medium facing surface; and a second portion that is adjacent to the first portion and located farther from the medium facing surface than is the first portion;

the second portion has a thickness greater than that of the first portion;

each of the first portion and the second portion has a bottom surface that is closer to the substrate;

the bottom surface of the second portion is located closer to the substrate than is the bottom surface of the first portion;

the first shield has a first top surface portion that is opposed to the bottom surface of the first portion with the first gap layer in between, and a second top surface portion that is opposed to a part of the bottom surface of the second portion with the first gap layer in between;

the nonmagnetic layer has a third top surface portion that is opposed to another part of the bottom surface of the second portion with the first gap layer in between; and a difference in level is formed between the first top surface portion and the second top surface portion of the first shield such that the second top surface portion is located closer to the substrate than is the first top surface portion, the method comprising the steps of:

forming a layer for shield that will be partially etched later to thereby become the first shield;

forming a layer to be etched that will be partially etched later to thereby become the nonmagnetic layer;

partially etching the layer for shield and the layer to be etched so that the first top surface portion and the second top surface portion are formed in a top surface of the layer for shield and the layer for shield thereby becomes the first shield, and so that the third top surface portion is formed in a top surface of the layer to be etched and the layer to be etched thereby becomes the nonmagnetic layer;

forming the first gap layer to cover the first to third top surface portions;

forming the pole layer on the first gap layer;

forming the second gap layer after the pole layer is formed;

forming the second shield after the second gap layer is formed; and forming the coil.

* * * * *